US012810600B2

(12) United States Patent
Roy

(10) Patent No.: US 12,810,600 B2
(45) Date of Patent: Nov. 24, 2026

(54) SYSTEMS, METHODS, AND APPARATUSES FOR IMPLEMENTING TRANSPARENT MODELS FOR COMPUTER VISION AND IMAGE RECOGNITION UTILIZING DEEP LEARNING NON-TRANSPARENT BLACK BOX MODELS

(71) Applicant: Arizona Board of Regents on behalf of Arizona State University, Scottsdale, AZ (US)

(72) Inventor: Asim Roy, Phoenix, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 127 days.

(21) Appl. No.: 18/293,315

(22) PCT Filed: Aug. 24, 2022

(86) PCT No.: PCT/US2022/041365
§ 371 (c)(1),
(2) Date: Jan. 29, 2024

(87) PCT Pub. No.: WO2023/028135
PCT Pub. Date: Mar. 2, 2023

(65) Prior Publication Data

US 2025/0095347 A1 Mar. 20, 2025

Related U.S. Application Data

(60) Provisional application No. 63/236,393, filed on Aug. 24, 2021.

(51) Int. Cl.
*G06V 10/82* (2022.01)
*G06V 10/778* (2022.01)

(52) U.S. Cl.
CPC .......... *G06V 10/82* (2022.01); *G06V 10/7788* (2022.01)

(58) Field of Classification Search
CPC ................... G06N 3/02–105; G06V 10/77–82
See application file for complete search history.

(56) References Cited

U.S. PATENT DOCUMENTS

2019/0114511 A1 4/2019 Gao et al.
2019/0272375 A1* 9/2019 Chen ........................ G06N 3/09
(Continued)

FOREIGN PATENT DOCUMENTS

AU 2022334445 A1 2/2024
CN 118284894 A 7/2024
(Continued)

OTHER PUBLICATIONS

Zhang et al "Interpreting CNN through decision trees" arXiv:1802.00121 Feb. 2019 (Year: 2019).*
(Continued)

*Primary Examiner* — Sean T Motsinger
(74) *Attorney, Agent, or Firm* — Elliott, Ostrander & Preston, P.C.

(57) ABSTRACT

Described herein are means for systematically generating transparent models for computer vision and image recognition utilizing deep learning non-transparent black box models. According to a particular embodiment, there is a specially configured system for generating an explainable AI model by performing operations, including: training a Convolutional Neural Network (CNN) to classify objects; training a Convolutional Neural Network (CNN) to classify objects from training data having a set of training images; training a multi-layer perceptron (MLP) to recognize both the objects and parts of the objects; generating the explainable AI model based on the training of the MLP; receiving
(Continued)

an image having an object embedded therein, wherein the image forms no portion of the training data for the explainable AI model; executing the CNN and the explainable AI model within an image recognition system, and generating a prediction of the object in the image via the explainable AI model; recognizing parts of the object; providing the parts recognized within the object as evidence for the prediction of the object; and generating a description of why the image recognition system predicted the object in the image based on the evidence comprising the recognized parts.

21 Claims, 30 Drawing Sheets

(56) References Cited

U.S. PATENT DOCUMENTS

| | | | | |
|---|---|---|---|---|
| 2020/0184278 | A1 | 6/2020 | Zadeh et al. | |
| 2020/0302318 | A1 | 9/2020 | Hetherington et al. | |
| 2021/0049346 | A1 | 2/2021 | Skala et al. | |
| 2021/0097382 | A1* | 4/2021 | Mathews ............... | G06N 3/045 |
| 2021/0110275 | A1* | 4/2021 | Chen .................... | G06V 10/751 |
| 2021/0232915 | A1 | 7/2021 | Dalli et al. | |
| 2021/0241034 | A1 | 8/2021 | Laradji et al. | |

FOREIGN PATENT DOCUMENTS

| | | | |
|---|---|---|---|
| EP | 4392906 | A1 | 7/2024 |
| HK | 40112719 | A | 1/2025 |
| JP | 2024545545 | A | 12/2024 |
| WO | 2023028135 | A1 | 3/2023 |

OTHER PUBLICATIONS

ISR & WO for Application No. PCT/US22/41365, dated Dec. 28, 2022, 12 pages.

Bologna, Guido, "Propositional Rules Generated at the Top Layers of a CNN," May 10, 2019 (May 10, 2019), Advances in Databases and Information Systems; [Lecture Notes in Computer Science; Lecture Notes in Computer Science, Springer International Publishing, Cham, pp. 432-440.

Extended European Search Report for European Patent Application No. 22862029.0, mailed 20250717, 7 pages.

Zhang, Q., et al. "Interpreting CNNs via Decision Trees," arXiv:1802.00121v1 [cs. CV], 2018, 8 pages.

Su, J., et al. "One Pixel Attack for Fooling Deep Neural Networks," IEEE Transactions on Evolutionary Computation, vol. 23, Issue 5, Oct. 2019, pp. 828-841.

Suthana, N., et al. "Percepts to recollections: insights from single neuron recordings in the human brain," Trends in Cognitive Sciences, vol. 16, Issue 8, 2012, pp. 427-436.

Szegedy, C., et al. "Intriguing properties of neural networks," arXiv preprint arXiv:1312.6199v4, 2014, 10 pages.

Tan, C., et al. "A Survey on Deep Transfer Learning," In International Conference on Artificial Neural Networks, 2018, Springer, Cham, pp. 270-279.

Van Assche, A., et al., "Seeing the Forest Through the Trees: Learning a Comprehensible Model from an Ensemble," In European Conference on Machine Learning, Berlin, Heidelberg: Springer Berlin Heidelberg, 2007, pp. 418-429.

Xu, F., et al. "Explainable Al: A Brief Survey on History, Research Areas, Approaches and Challenges," In CCF International Conference on Natural Language Processing and Chinese Computing, Cham: Springer International Publishing, 2019, pp. 563-574.

Zhang, N., et al. "Part-Based R-CNNs for Fine-Grained Category Detection," In European Conference on Computer Vsion, Cham: Springer International Publishing, 2014, pp. 834-849.

Zhang, Q., et al. "Interpretable Convolutional Neural Networks," In Proceedings of the IEEE Conference on Computer Vision and Pattern Recognition, 2018, pp. 8827-8836.

Zhang, Q., et al. "Mining Object Parts from CNNs via Active Question-Answering." In Proceedings of the IEEE Conference on Computer Vision and Pattern Recognition, 2017, pp. 346-355.

Zhang, Q-S., et al. "Visual Interpretability for Deep Learning: A Survey," Frontiers of Information Technology & Electronic Engineering, vol. 19, Issue 1, Jan. 2018, pp. 27-39.

Zhao, B., et al. "A survey on deep learning-based fine-grained object classification and semantic segmentation," International Journal of Automation and Computing, vol. 14, No. 2, 2017, pp. 119-135.

Zheng, H., et al. "Learning Multi-attention Convolutional Neural Network for Fine-Grained Image Recognition," In Proceedings of the IEEE International Conference on Computer Vision, 2017, pp. 5209-5217.

Zhou, B., et al. "Object Detectors Emerge in Deep Scene CNNs," arXiv preprint arXiv:1412.6856, 2014, 9 pages.

Zhou, Z-H., et al. "Extracting symbolic rules from trained neural network ensembles," AI Communications, 2003, vol. 16, Issue 1, pp. 3-15.

Alet, F., et al. "Modular meta-learning," In In Conference on Robot Learning, PMLR, vol. 87, 2018, pp. 856-868.

Baehrens, D., et al. "How to Explain Individual Classification Decisions," The Journal of Machine Learning Research, vol. 11, 2010, pp. 1803-1831.

Berg, T., et al. "POOF: Part-Based One-vs.-One Features for Fine-Grained Categorization, Face Verification, and Attribute Estimation," In Proceedings of the IEEE Conference on Computer Vision and Pattern Recognition (CVPR), 2013, pp. 955-962.

Carneiro, T., et al. "Performance Analysis of Google Colaboratory as a Tool for Accelerating Deep Learning Applications," IEEE Access, vol. 6, 2018, pp. 61677-61685.

Chollet, F., "Xception: Deep Learning with Depthwise Separable Convolutions," Proceedings of the IEEE Conference on Computer Vision and Pattern Recognition, 2017, pp. 1251-1258.

Creswell, A., et al. "Generative Adversarial Networks: An Overview," IEEE Signal Processing Magazine, vol. 35, Issue: 1, Jan. 2018, pp. 53-65.

Deng, J. et al., "ImageNet: A Large-Scale Hierarchical Image Database," 2009 IEEE Conference on Computer Vision and Pattern Recognition, 2009, pp. 248-255.

Deng, L., "The MNIST Database of Handwritten Digit Images for Machine Learning Research [Best of the Web]," IEEE Signal Processing Magazine, vol. 29, Issue 6, Nov. 2012, pp. 141-142.

Dong, Y., et al. "Towards Interpretable Deep Neural Networks by Leveraging Adversarial Examples," arXiv preprint arXiv: 1708.05493, 2017, 12 pages.

Doran, D., et al. "What Does Explainable AI Really Mean? A New Conceptualization of Perspectives," arXiv:1710.00794v1 [cs.AI] Oct. 2, 2017, 8 pages.

Dosovitskiy, A., et al. "Inverting Visual Representations With Convolutional Networks," Proceedings of the IEEE Conference on Computer Vision and Pattern Recognition (CVPR), 2016, pp. 4829-4837.

Goodfellow, I.J., et al. "Explaining and Harnessing Adversarial Examples," doi:10.48550/arXiv.1412.6572, 2014, 11 pages.

Goodfellow, I.J., et al., "Generative Aadversarial Nets," in Advances in Neural Information Processing Systems, 2014, 9 pages.

Gunning, D., "Explainable Artificial Intelligence (XAI)," Defense Advanced Research Projects Agency (DARPA), nd Web, 2(2), 32 pages.

Gunning, D., et al. "DARPA's explainable artificial intelligence (XAI) program." Al magazine, vol. 40, No. 2 (2019), pp. 44-58.

Han, F., et al. "Bottom-Up/Top-Down Image Parsing with Attribute Grammar," IEEE Transactions on Pattern Analysis and Machine Intelligence, vol. 31, Issue 1, Jan. 2009, pp. 59-73.

Harradon, M., et al. "Causal Learning and Explanation of Deep Neural Networks via Autoencoded Activations," arXiv preprint arXiv:1802.00541, 2018, 8 pages.

He, K. et al., "Deep Residual Learning for Image Recognition", Proceedings of the IEEE Conference on Computer Vision and Pattern Recognition (CVPR), Jun. 2016, pp. 770-778.

Hendricks, L.A., et al. "Generating Visual Explanations," arXiv: 1603.08507v1 [cs. CV] Mar. 28, 2016, 17 pages.

(56) References Cited

OTHER PUBLICATIONS

Hinton, G., "How to represent part-whole hierarchies in a neural network," arXiv preprint arXiv:2102. 12627v1 [cs.CV], 2021, 44 pages.
Hu, R., et al. "Learning to Reason: End-to-End Module Networks for Visual Question Answering," In Proceedings of the IEEE International Conference on Computer Vision, 2017, pp. 804-813.
Huang, S., et al. "Part-Stacked CNN for Fine-Grained Visual Categorization," Proceedings of the IEEE Conference on Computer Vision and Pattern Recognition (CVPR), 2016, pp. 1173-1182.
Hubel, D.H., et al. Receptive Fields, Binocular Interaction and Functional Architecture in the Cat's Visual Cortex. The Journal of Physiology, vol. 160, No. 1, 1961, pp. 106-154.
Ketkar, N., "Introduction to Keras," In Deep learning with Python, 2017, Berkeley, CA: Apress, pp. 97-111.
Krause, J., et al. "Learning Features and Parts for Fine-Grained Recognition," In 2014 22nd International Conference on Pattern Recognition, IEEE, pp. 26-33.
Lecun, Y. et al., "Deep learning", Nature, May 2015, vol. 521, No. 7553, pp. 436-444.
Lecun, Y., et al., "Gradient-Based Learning Applied to Document Recognition," Proceedings of the IEEE, vol. 86, No. 11, 1998, pp. 2278-2324.
Lin, D., et al. "Deep LAC: Deep Localization, Alignment and Classification for Fine-Grained Recognition," Proceedings of the IEEE Conference on Computer Vision and Pattern Recognition (CVPR), 2015, pp. 1666-1674.
Mahendran, A., et al. "Understanding Deep Image Representations by Inverting Them," Proceedings of the IEEE Conference on Computer Vision and Pattern Recognition (CVPR), 2015, pp. 5188-5196.
Newell, A., et al. "Computer Science as Empirical Inquiry: Symbols and Search," In ACM Turing Award Lectures, 2007, Awarded 1975, 14 pages.
Nguyen, A., et al. "Plug & Play Generative Networks: Conditional Iterative Generation of Images in Latent Space," Proceedings of the IEEE Conference on Computer Vision and Pattern Recognition (CVPR), 2017, pp. 4467-4477.
Nicolae, M.I., et al. "Adversarial Robustness Toolbox v1. 0.0," arXiv preprint arXiv: 1807.01069v4, 2019, 34 pages.
Pan, X., et al. "Category representation and generalization in the prefrontal cortex," European Journal of Neuroscience, 35(7), 2012, pp. 1083-1091.
Park, D.H., et al. "Multimodal Explanations: Justifying Decisions and Pointing to the Evidence," Proceedings of the IEEE Conference on Computer Vision and Pattern Recognition (CVPR), 2018, pp. 8779-8788.
Qi, Z., et al., "Learning Explainable Embeddings for Deep Networks," In NIPS Workshop on Interpretable Machine Learning (vol. 31), 2017, 4 pages.
Quiroga, R.Q, et al. "Sparse but not 'Grandmother-cell' coding in the medial temporal lobe," Trends in Cognitive Sciences, vol. 12, Issue 3, 2008, pp. 87-91.
Quiroga, R.Q., et al. "Explicit Encoding of Multimodal Percepts by Single Neurons in the Human Brain," Current Biology, vol. 19, Issue 15, 2009, pp. 1308-1313.
Ramanishka, V., et al. "Top-down Visual Saliency Guided by Captions," In Proceedings of the IEEE Conference on Computer Vision and Pattern Recognition, 2017, pp. 7206-7215.
Ribeiro, M.T., et al. ""Why Should I Trust You?": Explaining the Predictions of Any Classifier," In Proceedings of the 22nd ACM SIGKDD International Conference on Knowledge Discovery and Data Mining, 2016, pp. 1135-1144.
Roy, A., "A New Era for Explainable AI Where Definition of Explanation Comes First Rather Than Model Creation," Phalanx, vol. 58, No. 2, 2025, pp. 14-21.
Roy, A., "A theory of the brain: localist representation is used widely in the brain," Frontiers in Psychology, vol. 3, Article 551, 2012, 4 pages.
Roy, A., "An extension of the localist representation theory: grandmother cells are also widely used in the brain," Frontiers in Psychology, vol. 4, Article 300, 2013, 3 pages.
Roy, A., "Space-Based Moving Target Indicators," Phalanx, vol. 56, No. 4, 2023, pp. 16-23.
Roy, A., "The Theory of Localist Representation and of a Purely Abstract Cognitive System: The Evidence from Cortical cols. Category Cells, and Multisensory Neurons," Frontiers in Psychology, vol. 8, Article 186, 2017, 14 pages.
Roy, A., et al."Decoding a Convolutional Neural Network to Recognize Parts of Objects and Create a Symbolic Model for Explainable AI," 2025, 11 pages.
Roy, A., et al. "Explainable Al (XAI) for Object Detection and Application to Satellite Imagery," IEEE Access, vol. 13 (2025), pp. 185597-185623.
Simonyan, K. et al., "Deep Inside Convolutional Networks: Visualising Image Classification Models and Saliency Maps," arXiv preprint arXiv:1312.6034, 2013, 8 pages.
Simonyan, K., et al. "Very Deep Convolutional Networks for Large-Scale Image Recognition," arXiv preprint arXiv:1409.1556, 2014, 14 pages.
Stefik, M., et al. "Explaining autonomous drones: An XAI journey," Applied Al Letters, vol. 2, Issue 4, 2021, 12 pages.
Stone, A., et al. "Teaching Compositionality to CNNs," In Proceedings of the IEEE Conference on Computer Vision and Pattern Recognition, 2017, pp. 5058-5067.

* cited by examiner

100

FIG. 2
Cat Images 205
Bird Images 206
Car Images 207
Motorbike Images 208

200

300

Husky Images 305

Wolf Images 306

FIG. 7
700
Cat Heads 705
Cat Legs 710
Cat Bodies 715
Cat Tails 720

FIG. 10
Motorbike Rear Wheels 1005
Motorbike Front Wheels 1010
Motorbike Handlebars 1015
Motorbike Seats 1020
Motorbike Fronts 1025
Motorbike Rears 1030

FIG. 13

1300

TABLE 1:

| | CNN | MLP | Who Learns Composition + Connectivity |
|---|---|---|---|
| Figure 6A | 1. Single Label<br>2. Trained to recognize objects only | 1. Multilabel<br>2. Trained to recognize both objects & parts | MLP |
| Figure 6B | 1. Multilabel<br>2. Trained to recognize both objects & parts | None | CNN |
| Figure 6C | 1. Single Label<br>2. Trained to recognize both objects & parts | 1. Multilabel<br>2. Trained to recognize both objects & parts | MLP |

FIG. 14

1400

TABLE 2:

| Problem Object Classes | Number of Original Images for Training, Testing, CNNs, MLPs | Number of Object Part Images for Training, Testing MLPs |
|---|---|---|
| Cars, Motorbikes, Cats, Birds | 4091 | 5934 |
| Cats, Dogs | 1248 | 1000 |
| Huskies, Wolves | 1969 | 600 |

FIG. 15

1500

TABLE 3:

| CNN | CNN WITH PARTS | | KERAS MLP | | |
|---|---|---|---|---|---|
| Type + Size of FC Layer | Train Accuracy | Train Accuracy | XAI-MLP Train Accuracy | XAI-MLP Train Accuracy | TEST ACCURACY Difference = XAI-MLP - CNN |
| | A | B | C | D | E |
| VGG19 | | | | | |
| FC-32 | 91.25 | 88.27 | 93.68 | 90.51 | 2.24 |
| FC-64 | 92.53 | 88.41 | 96.13 | 91.17 | 2.76 |
| FC-128 | 94.13 | 90.25 | 97.05 | 92.89 | 2.64 |
| FC-256 | 95.31 | 90.25 | 99.25 | 92.36 | 0.53 |
| FC-512 | 96.04 | 92.75 | 99.90 | 93.94 | 1.19 |
| Xception | | | | | |
| FC-32 | 96.85 | 97.63 | 98.43 | 98.55 | 0.92 |
| FC-64 | 96.92 | 96.97 | 98.82 | 98.29+ | 1.32 |
| FC-128 | 97.51 | 97.36 | 99.84 | 98.55 | 1.19 |
| FC-256 | 97.35 | 97.76 | 99.97 | 98.42 | 0.66 |
| FC-512 | 97.97 | 97.10 | 100 | 98.81 | 1.71 |

FIG. 16

1600

TABLE 4:

| CNN | CNN WITH PARTS | | KERAS MLP | | |
|---|---|---|---|---|---|
| Type + Size of FC Layer | Train Accuracy | Train Accuracy | XAI-MLP Train Accuracy | XAI-MLP Train Accuracy | TEST ACCURACY Difference = XAI-MLP - CNN |
| | A | B | C | D | E |
| VGG19 | | | | | |
| FC-32 | 81.80 | 68.15 | 83.70 | 75.40 | 7.25 |
| FC-64 | 82.00 | 67.34 | 87.00 | 70.97 | 3.63 |
| FC-128 | 84.10 | 73.39 | 89.50 | 75.00 | 1.61 |
| FC-256 | 86.00 | 72.98 | 94.70 | 72.18 | -0.80 |
| FC-512 | 86.70 | 72.98 | 100.00 | 70.56 | -2.42 |
| Xception | | | | | |
| FC-32 | 93.00 | 81.45 | 94.80 | 81.85 | 0.40 |
| FC-64 | 92.20 | 81.45 | 95.40 | 85.08 | 3.63 |
| FC-128 | 94.20 | 83.47 | 98.60 | 82.66 | -0.81 |
| FC-256 | 95.40 | 82.66 | 99.90 | 83.47 | 0.81 |
| FC-512 | 95.80 | 81.45 | 99.90 | 75.85 | -5.60 |

FIG. 17

1700

TABLE 5:

| CNN | CNN WITH PARTS | | KERAS MLP | | |
|---|---|---|---|---|---|
| Type + Size of FC Layer | Train Accuracy | Train Accuracy | XAI-MLP Train Accuracy | XAI-MLP Train Accuracy | TEST ACCURACY Difference = XAI-MLP - CNN |
| | A | B | C | D | E |
| VGG19 | | | | | |
| FC-32 | 82.30 | 77.97 | 85.69 | 81.93 | 3.96 |
| FC-64 | 83.45 | 77.97 | 87.48 | 83.66 | 5.69 |
| FC-128 | 86.20 | 80.69 | 91.31 | 81.19 | 0.50 |
| FC-256 | 87.09 | 84.16 | 95.14 | 84.16 | 0.00 |
| FC-512 | 88.95 | 84.90 | 99.94 | 84.41 | -0.49 |
| Xception | | | | | |
| FC-32 | 87.22 | 78.96 | 79.74 | 85.64 | 6.68 |
| FC-64 | 89.97 | 83.17 | 92.08 | 84.41 | 1.24 |
| FC-128 | 90.80 | 87.38 | 94.31 | 88.86 | 1.48 |
| FC-256 | 91.63 | 90.10 | 98.72 | 85.15 | -4.95 |
| FC-512 | 92.59 | 90.59 | 100.00 | 84.90 | -5.69 |

FIG. 18

1800

TABLE 6:

| Best CNN Test Accuracy | | | Best XAI-MLP Test Accuracy | | | |
|---|---|---|---|---|---|---|
| A | B | C | D | E | F | |
| CNN Type | CNN Train Accuracy | CNN Test Accuracy | CNN Type | XAI-MLP Train Accuracy | XAI-MLP Test Accuracy | Test Accuracy Difference = XAI-MLP - CNN |
| | Huskies, Wolves | | | | | |
| Xception | | | Xception | | | |
| FC-256 | 97.35 | 97.76 | FC-512 | 100 | 98.81 | 1.05 |
| | Cats, Dogs | | | | | |
| Xception | | | Xception | | | |
| FC-128 | 94.2 | 83.47 | FC-64 | 95.4 | 85.08 | 1.61 |
| | Cars, Motorbikes, Cats, Birds | | | | | |
| Xception | | | Xception | | | |
| FC-512 | 92.59 | 90.59 | FC-128 | 94.31 | 88.86 | -1.73 |

FIG. 22

2200

TABLE 7:

| | Base CNN model for MNIST | |
|---|---|---|
| Epsilon | Mean | Std. Dev. |
| 0 | 98.39% | 0.09% |
| 0.01 | 97.75% | 0.13% |
| 0.02 | 96.22% | 0.20% |
| 0.03 | 93.87% | 0.37% |
| 0.04 | 90.45% | 0.61% |
| 0.05 | 85.89% | 1.01% |

FIG. 23

2300

TABLE 8:

| Epsilon | XAI-CNN model for MNIST | |
|---|---|---|
| | Mean | Std. Dev. |
| 0 | 97.97% | 0.05% |
| 0.01 | 97.93% | 0.08% |
| 0.02 | 97.86% | 0.08% |
| 0.03 | 97.79% | 0.07% |
| 0.04 | 97.75% | 0.08% |
| 0.05 | 97.71% | 0.11% |

FIG. 24

2400

TABLE 9:

| Epsilon | Base CNN model for Huskies & Wolves | |
|---|---|---|
| | Mean | Std. Dev. |
| 0 | 88.01% | 0.86% |
| 0.0005 | 73.20% | 2.25% |
| 0.001 | 59.51% | 3.25% |
| 0.0015 | 51.86% | 4.24% |
| 0.002 | 45.52% | 4.24% |

FIG. 25

2500

TABLE 10:

| Epsilon | XAI-CNN model for Huskies & Wolves | |
|---|---|---|
| | Mean | Std. Dev. |
| 0 | 85.08% | 0.89% |
| 0.0005 | 83.81% | 1.01% |
| 0.001 | 83.61% | 0.94% |
| 0.0015 | 83.40% | 0.94% |
| 0.002 | 83.35% | 0.91% |

SYSTEMS, METHODS, AND APPARATUSES FOR IMPLEMENTING TRANSPARENT MODELS FOR COMPUTER VISION AND IMAGE RECOGNITION UTILIZING DEEP LEARNING NON-TRANSPARENT BLACK BOX MODELS

CLAIM OF PRIORITY

This Application is a U.S. National Phase application under 35 U.S.C. § 371 of International Application No. PCT/US22/41365, filed Aug. 24, 2022, entitled "SYSTEMS, METHODS, AND APPARATUSES FOR IMPLEMENTING TRANSPARENT MODELS FOR COMPUTER VISION AND IMAGE RECOGNITION UTILIZING DEEP LEARNING NON-TRANSPARENT BLACK BOX MODELS" and this application further claims the benefit of U.S. Provisional Application No. 63/236,393, filed Aug. 24, 2021, entitled "SYSTEMS, METHODS, AND APPARATUSES FOR A TRANSPARENT MODEL FOR COMPUTER VISION/IMAGE RECOGNITION FROM A DEEP LEARNING NON-TRANSPARENT BLACK BOX MODEL", the entire contents of which are hereby incorporated by reference herein as though set forth in full.

GOVERNMENT RIGHTS AND GOVERNMENT AGENCY SUPPORT NOTICE

Support grants include: 2021 Dean's Excellence in Research Summer Research Grant, W. P. Carey School of Business, ASU, and 2020 Dean's Excellence in Research Summer Research Grant, W. P. Carey School of Business, ASU.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computer vision/image recognition from a deep-learning, non-transparent black box model, for use in every application area of deep learning for computer vision, including, but not limited to, military and medical applications, that benefit from models that are transparent and trustworthy.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Deep learning (also known as deep structured learning) is part of a broader family of machine learning methods based on artificial neural networks (ANNs) with representation learning. Learning can be supervised, semi-supervised or unsupervised.

Deep-learning architectures such as deep neural networks, deep belief networks, deep reinforcement learning, recurrent neural networks and convolutional neural networks have been applied to fields including computer vision, speech recognition, natural language processing, machine translation, bioinformatics, drug design, medical image analysis, material inspection and board game programs.

The adjective "deep" in deep learning refers to the use of multiple layers in the network. Early work showed that a linear perceptron cannot be a universal classifier, but that a network with a nonpolynomial activation function with one hidden layer of unbounded width can. Deep learning is a modern variation which is concerned with an unbounded number of layers of bounded size, which permits practical application and optimized implementation, while retaining theoretical universality under mild conditions. In deep learning the layers are also permitted to be heterogeneous and to deviate widely from biologically informed connectionist models, for the sake of efficiency, trainability and understandability, hence the "structured" part.

Machine learning, with the advent of deep learning, has had tremendous success as a technology. However, most deployments of the technology have been in low-risk areas. Two potential application areas of deep learning-based image recognition systems—in the military and medical arenas—have been hesitant to use this technology because these deep learning models are non-transparent, black box models that hardly anyone can understand.

What is needed are models that are transparent and trustworthy.

The present state of the art may therefore benefit from the systems, methods, and apparatuses for implementing transparent models for computer vision and image recognition utilizing deep learning non-transparent black box models, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 13 depicts Table 1 which shows who learns what in the CNN+MLP architectures, according to described embodiments;

FIG. 14 depicts Table 2 which shows the number of images used to train and test CNNs and MLPs, according to described embodiments;

FIG. 15 depicts Table 3 showing results for the "cars, motorbikes, cats, and birds" classification problem, according to described embodiments;

FIG. 16 depicts Table 4 showing results for the "cats vs. dogs" classification problem, according to described embodiments;

FIG. 17 depicts Table 5 showing results for the "huskies and wolves" classification problem, according to described embodiments;

FIG. 18 depicts Table 6 showing results comparing the best prediction accuracies of the CNN and XAI-MLP models, according to described embodiments;

FIG. 22 depicts Table 7 showing average test accuracies of the MNIST base CNN model, over 10 different runs, for adversarial images generated by different epsilon values, according to the described embodiments;

FIG. 23 depicts Table 8 showing average test accuracies of the XAI-CNN model, over 10 different runs, for adversarial images generated by different epsilon values, according to the described embodiments;

FIG. 24 depicts Table 9 showing average test accuracies of the Huskies and Wolves base CNN model, over 10 different runs, for adversarial images generated by different epsilon values, according to the described embodiments;

FIG. 25 depicts Table 10 showing average test accuracies of the Huskies and Wolves XAI-CNN model, over 10 different runs, for adversarial images generated by different epsilon values, according to the described embodiments;

DETAILED DESCRIPTION

Figure 1:
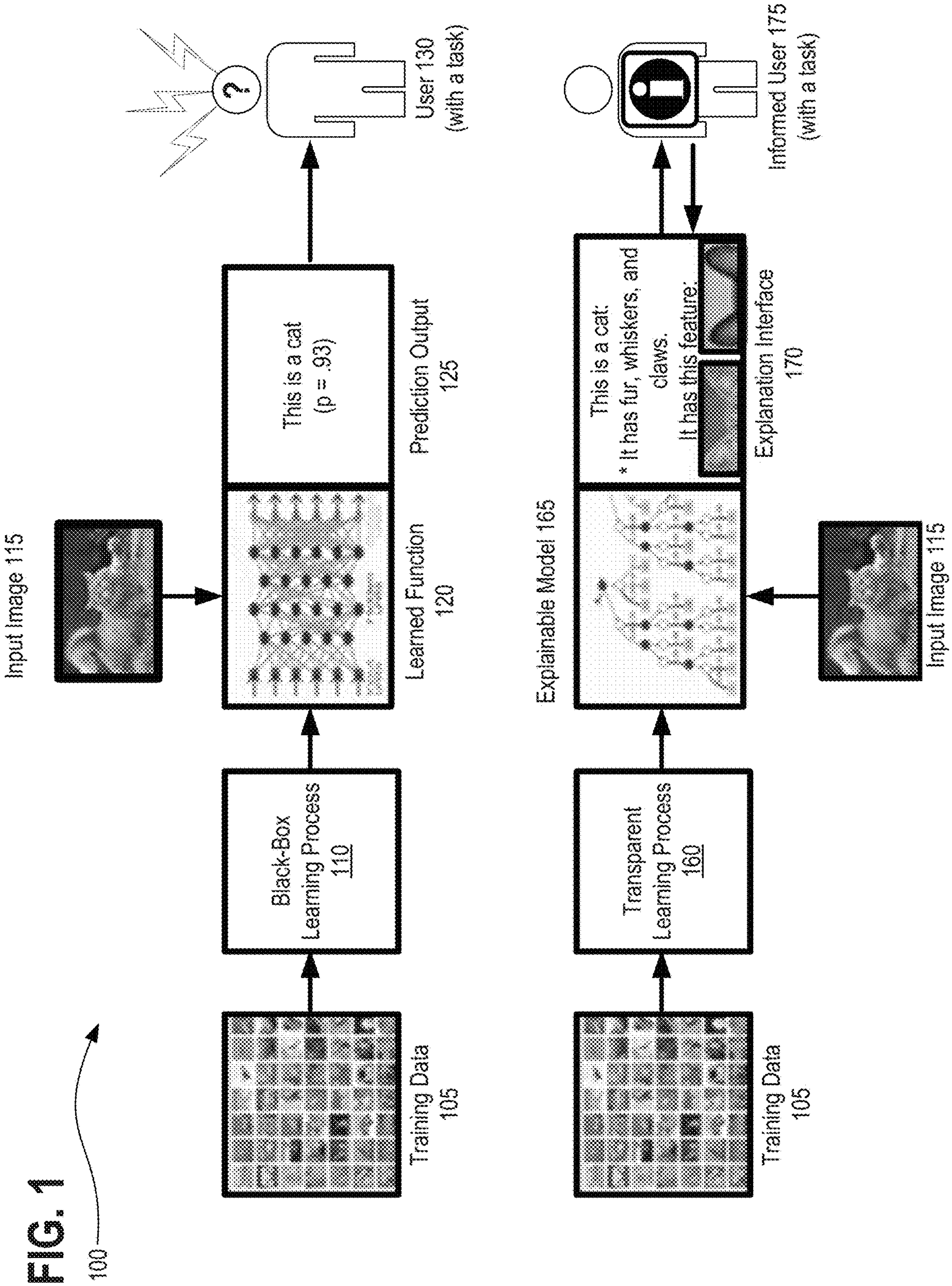
FIG. 1 depicts an exemplary architectural overview of a DARPA compliant Explainable AI (XAI) model having the described improvements implemented for an informed user, according to described embodiments.

Described herein are systems, methods, and apparatuses for implementing transparent models for computer vision and image recognition utilizing deep learning non-transparent black box models.

Recognizing the problem with deep learning for computer vision, the Defense Advanced Research Projects Agency ("DARPA") initiated a program called Explainable AI ("XAI") adopting the following goals:

According to DARPA, the Explainable AI (XAI) program aims to create a suite of machine learning techniques that: Produce more explainable models, while maintaining a high level of learning performance (prediction accuracy); and Enable human users to understand, appropriately trust, and effectively manage the emerging generation of artificially intelligent partners.

DARPA further explains that XAI has provided for dramatic success in machine learning has led to a torrent of Artificial Intelligence (AI) applications. DARPA asserts that continued advances promise to produce autonomous systems that will perceive, learn, decide, and act on their own. However, the effectiveness of these systems is limited by the machine's current inability to explain their decisions and actions to human users. According to DARPA, the Department of Defense ("DoD") is facing challenges that demand more intelligent, autonomous, and symbiotic systems. Explainable AI-especially explainable machine learning-will be essential if future war-fighters are to understand, appropriately trust, and effectively manage an emerging generation of artificially intelligent machine partners.

Thus, DARPA explains, the Explainable AI (XAI) program aims to create a suite of machine learning techniques that produce more explainable models, while maintaining a high level of learning performance (prediction accuracy); and Enable human users to understand, appropriately trust, and effectively manage the emerging generation of artificially intelligent partners. Further explaining that new machine-learning systems will have the ability to explain their rationale, characterize their strengths and weaknesses, and convey an understanding of how they will behave in the future. The strategy for achieving that goal is to develop new or modified machine-learning techniques that will produce more explainable models. According to DARPA, such models will be combined with state-of-the-art human-computer interface techniques capable of translating models into understandable and useful explanation dialogues for the end user. DARPA asserts that its strategy is to pursue a variety of techniques in order to generate a portfolio of methods that will provide future developers with a range of design options covering the performance-versus-explainability trade space.

DARPA provides further context by describing that XAI is one of a handful of current DARPA programs expected to enable "third-wave AI systems," where machines understand the context and environment in which they operate, and over time build underlying explanatory models that allow them to characterize real world phenomena. According to DARPA, the XAI program is focused on the development of multiple systems by addressing challenge problems in two areas: (1) machine learning problems to classify events of interest in heterogeneous, multimedia data; and (2) machine learning problems to construct decision policies for an autonomous system to perform a variety of simulated missions. These two challenge problem areas were chosen to represent the intersection of two important machine learning approaches (classification and reinforcement learning) and two important operational problem areas for the DoD (intelligence analysis and autonomous systems).

DARPA still further states that researchers are examining the psychology of explanation and more particularly, that XAI research prototypes are tested and continually evaluated throughout the course of the program. In May 2018, XAI researchers demonstrated initial implementations of their explainable learning systems and presented results of initial pilot studies of their Phase 1 evaluations. Full Phase 1 system evaluations are expected in November 2018. At the end of the program, the final delivery will be a toolkit library consisting of machine learning and human-computer interface software modules that could be used to develop future explainable AI systems. After the program is complete, these toolkits would be available for further refinement and transition into defense or commercial applications.

EXEMPLARY EMBODIMENTS

Specific embodiments of the invention create a transparent model for computer vision and image recognition from a deep learning, non-transparent black box, model, in which the transparent model that is created is consistent with the stated DARPA objectives through its Explainable AI (XAI) program. For example, if the disclosed image recognition system predicts that the image is that of a cat, then in addition to rendering what would otherwise be a non-transparent "black box" prediction, the disclosed system additionally provides an explanation for why the system "thinks" or renders a prediction that the image is that of a cat. For instance, such an exemplary system may output an explanation in support of the prediction that the transparent model executing upon the computer vision and image recognition considers the image to be that of a cat because the entity in the image appears to include whiskers, fur, and claws.

With such a supporting explanation as to "why" the system rendered a particular prediction, it can no longer be said to be a non-transparent or black box predictive model.

In a sense, DARPA's desired XAI system is based on recognizing parts of objects and presenting that as evidence for the prediction of an object. Embodiments of the invention described in greater detail below implement this desired functionality.

Embodiments of the invention further comprise computer-implemented methodologies which are specially configured for decoding a convolutional neural network (CNN) (a type of deep learning model) to recognize parts of objects. A separate model (a multi-layer perceptron), one that is provided information on composition of objects from parts and their connectivity, actually learns to decode the CNN. And this second model embodies the symbolic information for Explainable AI. It has been demonstrated experimentally that coding for object parts exist at many levels of a CNN and that part information can be easily extracted to explain the reasoning behind a classification decision. The overall approach to embodiments of the invention is similar to teaching humans about object parts.

According to exemplary embodiments, the following information is provided to the second model: information about the composition of objects from parts, including that of subassemblies, and the connectivity between the parts. The composition information is provided by listing the parts. For example, for a cat head, the list might include the eyes, nose, ears, and mouth. Embodiments can implement the overall approach in a variety of ways. The conventional wisdom is that accuracy is sacrificed for explainability. However, experimental results with this method show that explainability can substantially improve the accuracy of many CNN models. In addition, since the object parts are predicted by the second model, not just the objects, it is quite possible that adversarial training might become unnecessary.

The impact to the present state of the art and specifically the commercial potential of such disclosed embodiments is likely to affect many fields of applications. For instance, presently, the U.S. military, will not deploy existing deep learning-based image recognition systems without an explanation capability. Thus, disclosed embodiments of the invention as set forth herein will likely serve to open up that market and to improve U.S. Military capability and readiness. Further still, many other application areas would benefit from such an explanation capability beyond security and military readiness, such as medical diagnosis applications, human to computer interfaces, more efficient telecommunication protocols, and even improvements in the delivery of entertainment content and gaming engines.

A number of novel aspects relating to the described embodiments of the invention are set forth in greater detail below, including:

Embodiments having means for creating exactly the type of Explainable AI (XAI) model that DARPA had envisioned, acknowledging that, at present, there is no prior known technology capable of meeting the stated objectives.

Embodiments having means for rendering a DARPA XAI model compliant prediction of an object (e.g., such as a cat) that is based on verification of its unique parts (e.g., the whiskers, fur, claws).

Embodiments having means for creating a new prediction model trained to recognize unique parts of objects.

Embodiments having means for teaching the model to recognize parts by showing images of those parts (e.g., the trunk of an elephant), acknowledging that, at present, there is no prior known technology that follows this procedure of teaching a model to recognize parts by showing it images of different parts of objects.

Embodiments having means for teaching the new model compositionality of objects (and subassemblies) from elementary parts and their connectivity. For example, such embodiments "teach" the model, or cause the model to "learn," that an object defined as a "cat" consists of legs, body, face, tail, whiskers, furs, claws, eyes, nose, ears, mouth and so on. Such embodiments also teach the model or cause the model to learn that a subassembly, such as the face of an object defined as a cat, consists of parts including eyes, ears, nose, mouth, whiskers and so on. Again acknowledging that, at present, there is no prior known system that teaches a model the composition of objects (and subassemblies) from elementary parts.

The DARPA XAI model operates at the symbolic level, insomuch that the objects and their parts are all represented by symbols. With reference to the cat example, for such a system there would be symbols corresponding to the cat object and all its parts. Disclosed embodiments set forth herein expand upon and extend such capabilities by allowing the user to control the symbolic model in the sense that the parts list any given object is definable by the user. For example, the system enables such a user to choose to only recognize the legs, face, body and tail of a cat and nothing else. As before, there simply is no prior known system that allows the user the flexibility of defining the symbolic model when configuring a specifically desired implementation as is necessary for that particular user's objectives.

The DARPA XAI model provides protection from adversarial attacks by making object prediction conditioned on independent verification of the parts. Disclosed embodiments set forth herein expand upon and extend such capabilities by allowing the user to define the parts to be verified. Generally speaking, enhanced and additional part verification provides for more protection from adversarial attacks. As before, there is no prior known system that allows an end-user to define the level of protection in the manner which is enabled by the described embodiments.

According to exemplary embodiments, a symbolic AI model is integrated into a production system for fast classification of objects in images.

Many existing systems depend on visualization, require human verification, and cannot be easily integrated into a production system that has no human in the loop. For these reasons, there are a number of advantages to embodiments of the invention when compared with the known state of the art, including:

There is no other currently available system in the market that can construct a symbolic AI model of the type specified by DARPA. Embodiments of the invention can construct such a model.

Currently, to protect against adversarial attacks, deep learning models must be specially trained to recognize adversarial attacks. But, even then, there is no guaranteed protection against such attacks. Embodiments of the invention can provide a much higher level of protection from adversarial attacks than existing systems for computer vision without requiring adversarial training.

Experiments show that higher prediction accuracy is achieved compared to existing methods with a symbolic AI system whose predictions are based on recognizing parts.

A symbolic AI model can be easily integrated into a production system for fast classification of objects in images. Many of the existing systems depend on visualization, needs human verification, and cannot be easily integrated into a production system that has no human in the loop.

Embodiments of the invention, being able to create a user-defined symbolic model, provide the transparency and trust in models from a user perspective. That transparency and trust in black-box models is highly desirable in the field of computer vision.

Embodiments of the invention include a method to decode a convolutional neural network (CNN) to recognize parts of objects. A separate multi-target model (for example, an MLP or equivalent model), one that is provided information on composition of objects from parts and their connectivity, actually learns to decode the CNN activations. And this second model embodies the symbolic information for Explainable AI. Experiments demonstrated that coding for object parts exist at many levels of a CNN and that part information can be easily extracted to explain the reasoning behind a classification decision. The approach of embodiments of the invention is similar to teaching humans about object parts. The embodiments provide information about the composition of objects from parts, including that of subassemblies, and the connectivity between the parts, to the second model. Embodiments provide composition information by listing the parts, but do not provide any location information. For example, for a cat head, the list might include the eyes, nose, ears, and mouth. Embodiments only list the parts of interest. Embodiments can implement the overall approach in a variety of ways. The following description presents a particular embodiment and illustrates the approach using some ImageNet-trained CNN models, such as those including Xception, Visual Geometry Group ("VGG"), and ResNet. Conventional wisdom dictates that one must sacrifice accuracy for explainability. However, experimental results show that explainability can substantially improve the accuracy of many CNN models. In addition, since the object parts are predicted in the second model, not just the objects, it is quite possible that adversarial training might become unnecessary. The second model is framed as a multi-target classification problem.

Embodiments of the invention use multi-target models. In one embodiment, the multi-target model is a multi-layer perceptron (MLP) is a class of feedforward artificial neural network (ANN). Other embodiments may use an equivalent multi-target model. The term MLP is used ambiguously, sometimes loosely to mean any feedforward ANN, sometimes strictly to refer to networks composed of multiple layers of perceptrons (with threshold activation). Multi-layer perceptrons are sometimes colloquially referred to as "vanilla" neural networks, especially when they have a single hidden layer.

An MLP consists of at least three layers of nodes: an input layer, a hidden layer and an output layer. Except for the input nodes, each node is a neuron that uses a nonlinear activation function. MLP utilizes a supervised learning technique called backpropagation for training. Its multiple layers and non-linear activation distinguish MLP from a linear perceptron. It can distinguish data that is not linearly separable.

If a multilayer perceptron has a linear activation function in all neurons, such as a linear function that maps the weighted inputs to the output of each neuron, then any number of layers can be reduced to a two-layer input-output model. In MLPs some neurons use a nonlinear activation function that was developed to model the frequency of action potentials, or firing, of biological neurons. Learning occurs in the perceptron by changing connection weights after each piece of data is processed, based on the amount of error in the output compared to the expected result. This is an example of supervised learning, and is carried out through backpropagation, a generalization of the least mean squares algorithm in the linear perceptron.

FIG. 1 depicts an exemplary architectural overview of a DARPA-compliant Explainable AI (XAI) model having the described improvements implemented for an informed user.

As is shown, there are two approaches depicted. First, the exemplary architecture 100 depicts a model having been trained upon training data 105 which is processed through a black box learning process 110 resulting in a learned function at block 120. The trained model can then receive the input image 115 for processing responsive to which a prediction output 125 is rendered from the system to the user 130 having a particular task to solve. Because the process is non-transparent, there is no explanation provided, resulting in frustration for the user who may ask questions such as "Why did you do that?" or "Why not something else?" or "When do you succeed?" or When do you fail?" or "When can I trust you?" or How do I correct an error?"

Conversely, the improved model which is described here depicts at the bottom, the same training data 105 being provided to the transparent learning process 160 which then results in an explainable model 165 capable of receiving the same input image 115 from the prior example. However, unlike the prior model, there is now an explanation interface 170 which provides a transparent prediction and explanation to the informed user 175 attempting to solve for a particular task. As depicted, the explanation interface 170 provides to the user information such as "This is a cat" and "It has four, fur, whiskers, and claws" and "It has this feature" with a graphical depiction of cats' ears.

The hierarchical structure of images enable concept creation and extraction from CNNs. The understanding of contents of images has always been of interest in computer vision. In image parse graphs, one decomposes a scene, from scene labels, using a tree-like structure, to show objects, parts, and primitives and their functional and spatial relationships. The GLOM model seeks to answer the question: "How can a neural network with a fixed architecture parse an image into a part-whole hierarchy which has a different structure for each image?" The term "GLOM" is derived from the slang term, to "glom" together, as a representative approach to improve image processing through the use of transformers, neural fields, contrastive representation learning, distillation and capsules which enable static neural nets to represent dynamic parse trees.

The GLOM model generalizes the concept of capsules, where one dedicates a group of neurons to a particular part type in a particular region of the image, to the notion of a stack of auto-encoders for each small patch of an image. These auto-encoders then handle multiple levels of representation—from a nostril of a person to a nose to a face of that person all the way through the entirety or the "whole" of a person.

Introduction to the Exemplary Embodiments

Certain exemplary embodiments provide specially configured computer implemented methods that identify parts of objects from the activations of a fully connected layer of a convolutional neural network (CNN). However, part identification is also possible from the activations of other layers of a CNN. Embodiments involve teaching a separate model (a multi-target model, for example, an MLP) how to decode the activations by providing it information on the composition of objects from the parts and their connectivity.

Identification of parts of objects produces information at the symbolic level of the type envisioned by DARPA for Explainable AI (XAI), as shown in FIG. 1. The specific form conditions the recognition of an object to identification of its parts. For example, the form requires that to predict an object to be a cat, the system also needs to recognize some of the specific features of a cat, such as its fur, whiskers, and claws. Object prediction contingent on recognition of its parts or features provides additional verification for the object and makes the prediction robust and trustworthy. For instance, with such an image recognition system, a school bus, with small perturbations of a few pixels, will never be predicted as an ostrich because the ostrich parts (e.g., long legs, long neck, small head) are not present in the image. Thus, requiring identification of some parts of an object provides a very high level of protection in adversarial environments. Such systems cannot be tricked easily. And these systems, because of their inherent robustness, may additionally obviate the need for adversarial training with GANs and other mechanisms.

There are several different approaches to the part-whole identification problem. For instance, the GLOM approach builds a parse tree within a network to show the part-whole hierarchical structure. Conversely, described embodiments do not build nor do they require such parse trees.

Fine-grained object recognition tries to distinguish objects of subclasses of a general class, such as different species of birds or dogs. Many of the methods for fine-grained object recognition identify distinctive parts of subclasses of objects in a variety of ways. Some of these methods are discussed below as related concepts. However, the method of identifying parts of objects, according to embodiments of the invention, is different from all these methods. Specifically, described embodiments provide information to the learning system on the composition of objects from parts, and parts from component parts. For example, for a cat image, embodiments list parts of the cat that are visible, such as the face, legs, tail and so on. Embodiments do not indicate to the system where these parts are, such as with bounding boxes or similar mechanisms. Described embodiments list visible parts of the object in the image. For example, described embodiments may show the system the image of a cat's face and list the visible parts—the eyes, ears, nose, and the mouth. As such, described embodiments need only list parts that are of interest. Thus, if the nose and the mouth are not of interest for a particular problem or task, they would not be listed. Certain described embodiments also annotate the parts.

To reiterate, embodiments of the invention do not give any indication as to where the parts are in the image. Thus, described embodiments provide composition information, but no location information. Of course, embodiments of the invention show separate images of all the parts of interest-eyes, ears, nose, mouth, legs, tail and so on-so that the recognition system knows what these parts look like. However, the system learns the spatial relationship (also known as "connectivity") between these parts from the composition information provided. Thus, what is significantly different from prior known techniques for recognizing parts of objects is the ability to provide this compositionality information. Described embodiments teach the model (e.g., an MLP) the compositionality and spatial relationship of parts. Thus, the process of teaching the system about parts of objects is different from any known prior methodology or system for solving the same or similar problems.

On the issue of providing names or labels (annotations) for parts, embodiments of the invention rely on an understanding of human learning. It is probably fair to claim that both dogs and humans recognize various features of a human body such as legs, hands, and face. The only difference is that humans have names for those parts and dogs do not. Of course, humans do not inherit part names from their parents. In other words, humans are not inborn with object and part names, they must be taught. And this teaching can only occur after the visual system has learned to recognize those parts. Embodiments of the invention follow the same two-step approach to teaching part names: first let the system learn to recognize parts visually without having names for them, and then, to teach part names, embodiments of the invention provide a set of images with names for the parts.

High-level abstractions and their single-cell encoding in the brain is often found outside the visual cortex. The understanding of the brain from neurophysiological experiments is that the brain uses localized, single-cell representations extensively, especially for highly abstract concepts and for multi-modal invariant object recognition. Prior techniques used single-cell recordings of the visual system which resulted in findings of simple and complex cells, line orientation and motion detection cells and so on, essentially confirmed single-cell abstractions at the lowest levels of the visual structure. But other researchers reported finding more complex single-cell abstractions at higher levels of processing that encode modality invariant recognition of persons (e.g., Jennifer Aniston) and objects (e.g., Sydney Opera house). One estimate is that 40% of medial temporal lobe (MTL) cells are tuned to such explicit representation. Neuroscience experts contend experimental evidence shows that the PFC plays a critical role in category formation and generalization. They claim that the prefrontal neurons abstract the commonality across various stimuli. They then categorize them based on their common meaning by ignoring their physical properties.

What these neurophysiological findings mean is that the brain creates lots of models outside the visual cortex to produce various types of abstractions. Embodiments of the invention exploit these biological cues by (1) creating single neuron (node) abstractions for parts of objects, because parts are abstract concepts on their own, and (2) a separate model (an MLP) outside the CNN to recognize parts of objects. This, of course, is nothing new to CNNs because the models indeed use single output nodes for the object classes. Embodiments of the invention are just extending that single node representation scheme to parts of objects and adding those nodes to the output layer of an MLP.

Embodiments of the invention train a CNN model to recognize different objects. Such a trained CNN model is not given any information about the composition of objects from parts. Embodiments of the invention provide information about the composition of objects from parts and of parts (subassemblies) from other component parts only to the subsequent MLP model, which receives its input from a fully connected layer of the CNN. The separate MLP model simply decodes the CNN activations to recognize objects and parts and understand the spatial relationship between them. However, described embodiments never provide any location information for any of the parts, such as with bounding boxes common to prior known techniques. Rather, described embodiments simply provide a list of parts that make up an assembly in an image, such as a face.

However, note that, it is not necessary for embodiments to build a separate model (an MLP or any other classification model) to recognize the parts. The MLP model could as well be tightly coupled with the CNN model, and the integrated model trained to recognize both objects and parts.

The following section provides additional context regarding explainable AI in general, followed by explainable AI for computer vision and fine-grained object recognition. The section thereafter provides an intuitive understanding of embodiments of the invention. The next section provides additional detail regarding an algorithm utilized to implement specific embodiments of the invention, followed by a discussion regarding experimental results and concluding observations.

Explainable AI (XAI):

Explainability of AI systems takes many different forms depending on the usage of the AI system. In one such form, one describes an object or a concept by means of its properties, where these properties can be other abstract concepts (or sub-concepts). For example, one can describe cats (which is a high-level abstract concept) using some of their main features (which are abstract sub-concepts) such as legs, tail, head, eyes, ears, nose, mouth, and whiskers. This form of Explainable AI is directly related to symbolic AI where symbols represent the abstract concepts and sub-concepts. Embodiments of the invention present a method that can decode a convolutional neural network to extract this kind of abstract symbolic information.

From another perspective, Explainable AI methods for machine learning can be categorized as: (1) transparency by design, and (2) post-hoc explanation. Transparency by design uses model structure to start with that is interpretable, such as decision trees. Post-hoc explanation methods extract information from already learned black-box models and largely approximate their performance with new interpretable models. The benefit of this approach is that it does not affect the performance of the black-box models. Post-hoc methods mainly deal with the inputs and outputs of black-box models and are, therefore, model agnostic. From this perspective, embodiments of the invention employ a post-hoc method.

The Common Ground Learning and Explanation ("COGLE") system explains the learned capabilities of an XAI system that controls a simulated unmanned aerial system. COGLE uses a cognitive layer that bridges human-usable symbolic representations to the abstractions, compositions, and generalized patterns of the underlying model. The "common ground" notion here means establishing common terms to use for explanations and understand their meanings. Descriptions of embodiments of the invention also use this notion of common terms.

Range of Approaches to Explainable AI for Deep Learning:

Prior known methodologies to visualize and understand the representations (encodings) inside a CNN are available. For instance, there is a class of methods that mainly synthesize the image that maximally activates a unit or filter. Also known are up-convolutional methods which provide another type of visualization by inverting CNN feature maps to images. There are also methods that go beyond visualization and try to understand the semantic meaning of the features encoded by the filters.

Further still, there are methods that perform image level analysis for explanation. For instance, the LIME method extracts image regions that are highly sensitive to a network's prediction and provides explanations of an individual prediction by showing relevant patches of the image. General trust in a model is based on examining many such individual predictions. There is also a class of methods that identify pixels in the input image that are important for the prediction—e.g., sensitivity analysis and layer-wise relevance propagation.

Post-hoc methods include ones that learn semantic graphs to represent CNN models. These methods produce an interpretable CNN by making each convolutional filter a node in the graph, and then force each node to represent an object part. A related method learns a new interpretable model from a CNN through an active question-answering mechanism. There also are methods that generate textual explanations of the predictions. For example, such a method might say "This is a Laysan Albatross because this bird has a large wingspan, hooked yellow beak, and white belly." They use an LSTM stack on top of the CNN model to generate the textual explanation for the prediction.

Another approach is to jointly generate visual and textual information using an attention mask to localize salient regions when offering textual justifications. Such an approach uses visual question answering datasets to train such models. A caption-guided visual saliency map method has also been proposed that produces spatio-temporal heatmaps for predicted captions using an LSTM-based encoder-decoder that learns the relationship between pixels and caption words. One model provides explanations by creating several high-level concepts from deep networks and attaches a separate explanation network to a certain layer (could be any layer) in the deep network to reduce the network to a few concepts. These concepts (features) may not be human understandable initially, but domain experts can attach interpretable descriptions to these features. Research has found that object detectors emerge from training CNNs to perform scene classification and thus, they show that the same network can perform scene recognition and object localization, despite not being explicitly taught the notion of objects.

Part Identification in Fine-Grained Object Recognition:

There is a survey of deep learning-based methods for fine-grained object recognition. Most of the part-based methods focus on identifying subtle differences in parts of similar objects, such as say the color or shape of the beak of a subcategory of birds. For example, one proposal learns a set of specialized features of parts that discriminate between the fine-grained classes. Another trains part based RCNNs to detect both objects and discriminatory parts. They use bounding boxes on images to localize both objects and the discriminatory parts. During testing, all object and part proposals (bounding boxes) get scored and the best ones selected. They train a separate classifier for pose-normalized categorization based on features extracted from the localized parts. One part-stacked CNN approach uses one CNN to locate multiple object parts and a two-stream classification network that encodes both object-level and part-level cues. They annotate the center of each object part as a keypoint and train a fully convolutional network, called a localization network, with these keypoints to locate the object parts. These part locations are then fed into the final classification networks. The deep LAC in one proposal includes part localization, alignment, and classification in a single deep network. They train the localization network to recognize parts and generate bounding boxes for the parts for test images.

Embodiments of the invention do not use bounding boxes or keypoints to localize objects or parts. In fact, embodiments of the invention do not provide any location information to any of the models embodiments of the invention train. Embodiments of the invention do show images of parts, but as separate images, as explained in the next section. Embodiments of the invention also provide object-parts (or part-subparts) composition lists, but no location information. In addition, embodiments of the invention generally identify all the parts of an object, not just the discriminatory parts. Identifying all the parts of an object provides added protection against adversarial attacks.

What is common with part-based RCNN is that embodiments of the invention do identify the parts as separate object categories in the second MLP model.

Overview of the Algorithm

A general overview of embodiments of the invention and how such embodiments may be implemented in conjunction with the algorithm are provided. Illustrating the approach according to embodiment of the inventions is done using two problems: (1) classifying images of four distinct classes (an easy problem)—cars, motorbikes, cats, and birds; and (2) classifying images of two fine-grained classes (a harder problem)—huskies and wolves.

Figure 2:
FIG. 2 illustrates an approach according to embodiment of the inventions for classifying images of four distinct classes, according to described embodiments.

FIG. 2 illustrates an approach 200 according to embodiment of the inventions for classifying images of four distinct classes.

In particular, from the top, row 1 depicts cat images 205; row 2 depicts bird images 206; row 3 depicts car images 207; and row 4 depicts motorbike images 208.

Figure 3:
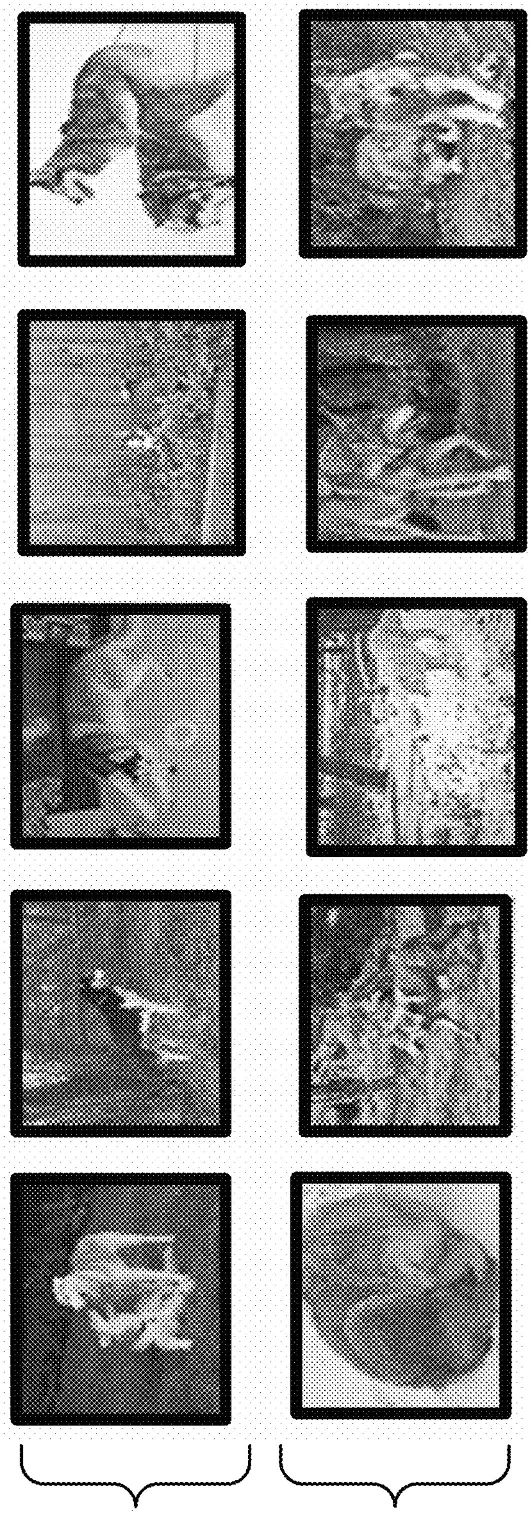
FIG. 3 illustrates an approach according to embodiment of the inventions for classifying images of two fine-grained classes, according to described embodiments.

FIG. 3 illustrates an approach 300 according to embodiment of the inventions for classifying images of two fine-grained classes.

In particular, from the top, row 1 depicts husky images 305; and row 2 depicts wolf images 306.

As depicted by FIGS. 2 and 3, there are sample images of the first problem as set forth at FIG. 2 and sample images of the second problem as set forth at FIG. 3.

Using a CNN for Object Classification:

According to a first step, embodiments of the invention train a CNN to classify the objects of interest. Here, embodiments of the invention can train a CNN from scratch or use transfer learning. In experiments, embodiments of the invention used transfer learning using some of the ImageNet-trained CNNs, such as ResNet, Xception, and VGG models. For transfer learning, embodiments of the invention freeze the weights of the convolutional layers of the ImageNet-trained CNNs, then add one flattened, fully connected (FC) layer followed by an output layer, like the one in FIG. 4, but with just one FC layer. Embodiments of the invention then train the weights of the fully connected layers for the new classification task.

Figure 4:
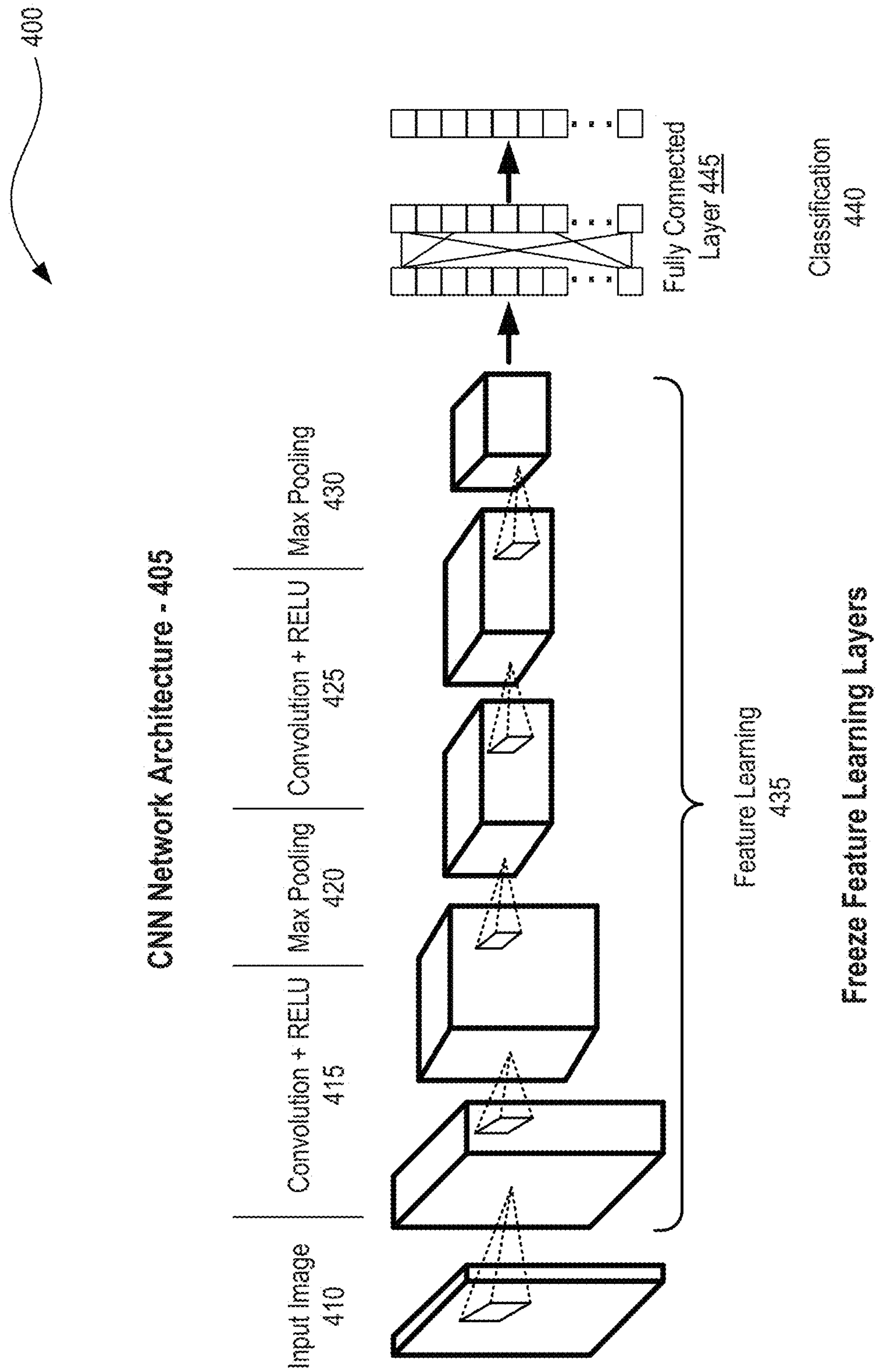
FIG. 4 depicts transfer learning for a new classification task, involving training only the weights of the added fully connected layer of the CNN, according to described embodiments.

FIG. 4 depicts transfer learning 400 for a new classification task, involving training only the weights of the added fully connected layer of the CNN, according to embodiments of the invention.

Specifically, there is depicted the CNN network architecture 405 which includes the freeze feature learning layers. Within the CNN network architecture 405, there is present both a feature learning 435 section and a classification 440 section. Within feature learning 435 there is depicted the input image 410, convolution+RELU 415, max pooling 420, convolution+RELU 425, and max pooling 430. Within the classification 440 section, there is depicted the fully connected layer 445, which completes the processing for the CNN network architecture 405.

As shown here, for the new classification task, the process trains only the weights of the added fully connected layer of the CNN.

More specifically, in the depicted architecture, a CNN is first trained to classify the objects. Here, the CNN is either trained from scratch or via transfer learning. In some experiments, certain ImageNet-trained CNN models were utilized for transfer learning, such as Xception, and VGG models. For transfer learning, the weights of the convolutional layers are generally frozen, and then a flattening layer is added, followed by a fully connected (FC) layer, and then finally an output layer, such as the example depicted at FIG. 5, except that just one FC layer is generally added. Then the weights of the fully connected layer for the new classification task are trained.

Figure 5:
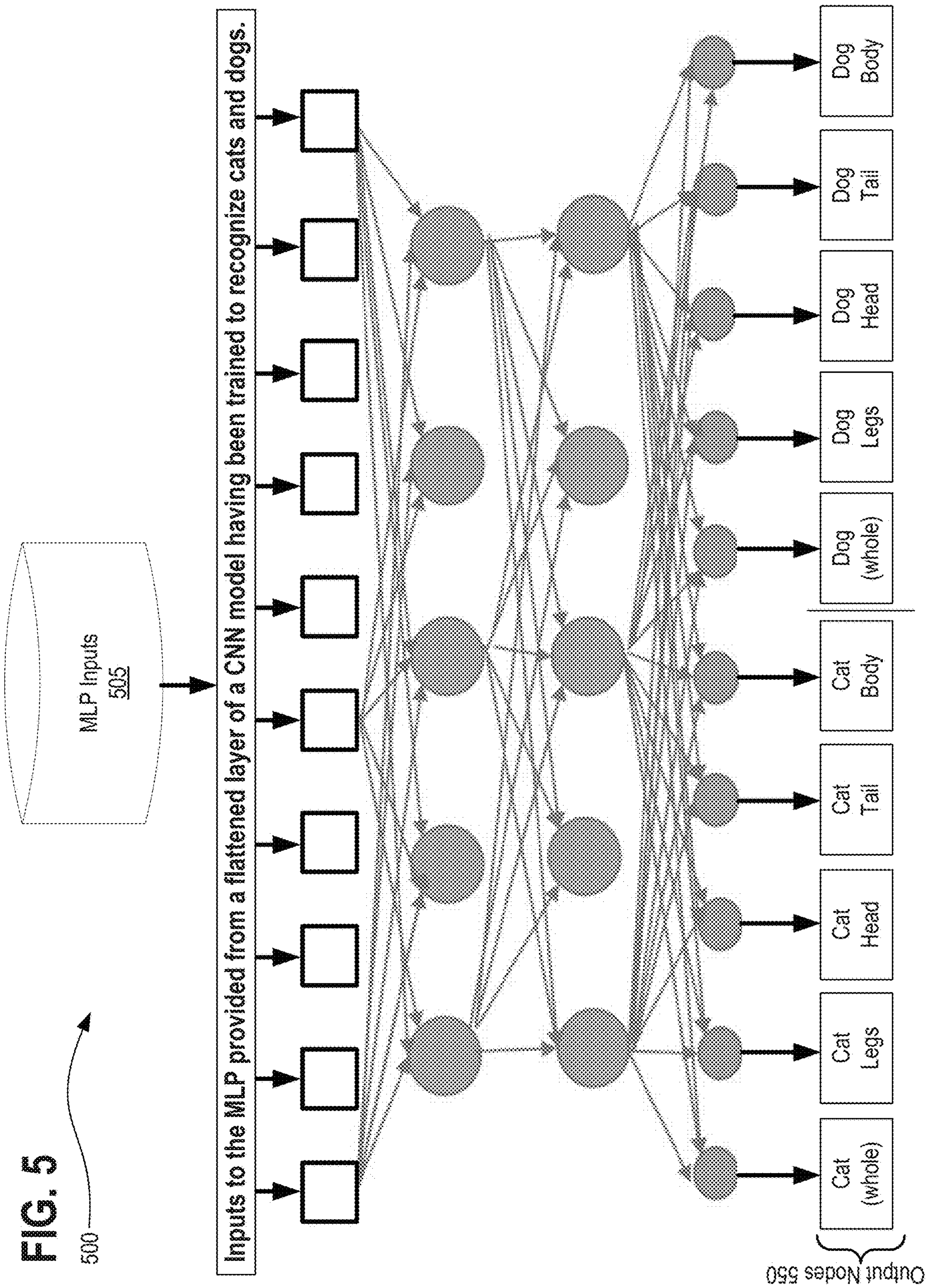
FIG. 5 illustrates training a separate multi-target MLP where the inputs come from the activations of a fully connected layer of the CNN and the output nodes of the MLP correspond to both objects and their parts, according to described embodiments.

Use of MLP for a Multi-Target Classification Problem:

Embodiments of the invention do not train the CNN to recognize parts of objects in an explicit manner. Embodiments of the invention do that in another model, where embodiments of the invention train a multi-layer perceptron (MLP) to recognize both the objects and their parts, as shown in FIG. 5. For example, for a cat object, embodiments of the invention may recognize some of its parts like legs, tail, face or head, and body. For a car, embodiments of the invention may recognize such parts as doors, tires, radiator grill, and roof. Note that all object parts may not exist for every object in a class (e.g., although roof is a part of most cars, some Jeeps are without roofs) or may not be visible in an image. In general, embodiments of the invention want to verify all the visible parts as part of the confirmation process for an object. For example, embodiments of the invention should not confirm that it is a cat unless embodiments of the invention can verify some of the cat parts that are visible.

FIG. 5 illustrates training a separate multi-target MLP 500 where the inputs come from the activations of a fully connected layer of the CNN and the output nodes of the MLP correspond to both objects and their parts, according to embodiments of the invention.

As shown here, processing of the MLP 500 includes training a separate multi-target MLP from where the MLP inputs 505 originate using the activations of a fully connected layer of the CNN. The output nodes 550 of the MLP 500 correspond to both objects (e.g., a whole cat or a whole dog) as well as their respective parts (e.g., the body, legs, head or tail of a cat or a dog). More specifically, the output nodes 550 of the multi-label MLP 500 correspond to objects and their parts and are set forth in a symbol-emitting form. The inputs to this MLP (e.g., MLP inputs 505) come from the activations of a fully connected layer of a CNN model trained to recognize the objects, but not the parts.

Certain post-hoc methods learn semantic graphs to represent CNN models. Such methods produce an interpretable CNN by making each convolutional filter a node in the graph, and then force each node to represent an object part. Other methods learn a new interpretable model from a CNN through an active question-answering mechanism. For instance, some models provide explanation by creating several high-level concepts from deep networks and then attach a separate explanation network to a certain layer as mentioned above.

The described embodiments recognize the parts by setting up the MLP for a multi-target classification problem, as shown in FIG. 5. In the output layer of the MLP, each object class and its parts have separate output nodes. The parts are, therefore, also classes of objects on their own. In this multi-target framework, when the input is the image of a whole cat, for example, all the output nodes of the MLP corresponding to the cat object, including its parts (head, legs, body, and tail), should activate.

Figure 6A:
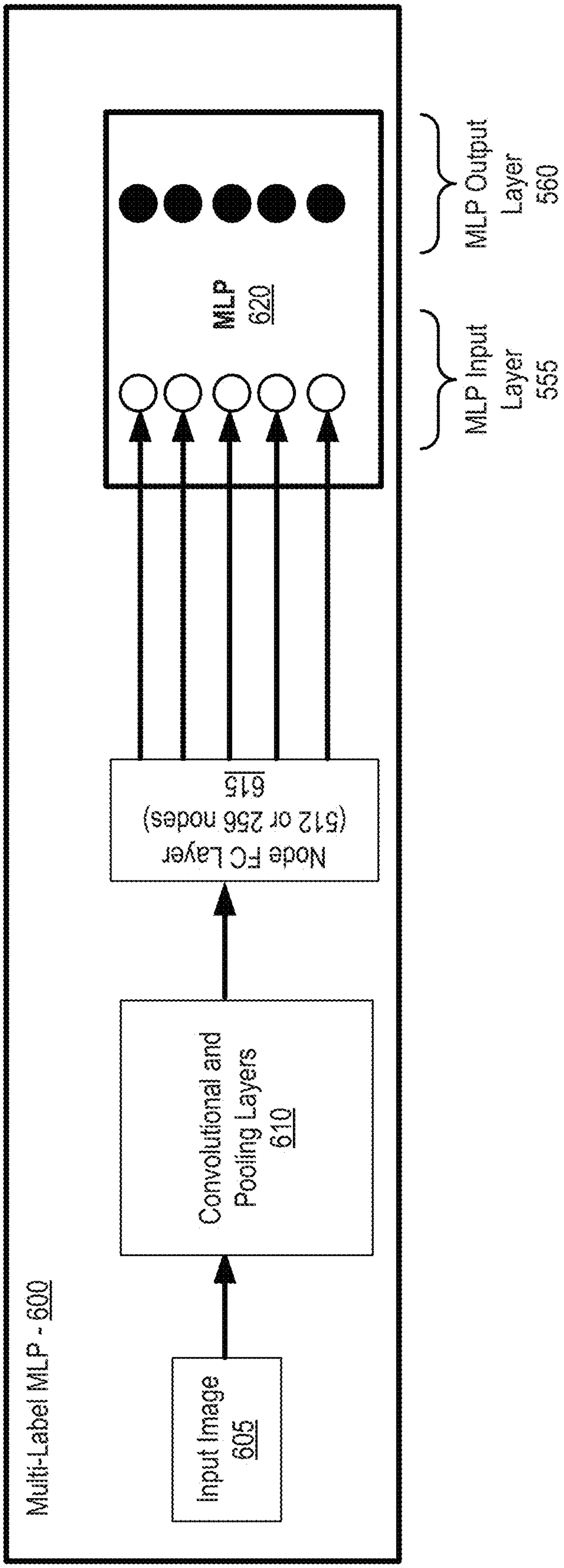
FIG. 6A illustrates training for a separate multi-label MLP where the inputs are the activations of a fully connected layer of the CNN, according to described embodiments.

FIG. 6A illustrates training for a separate multi-label MLP 600 where the inputs are the activations of a fully connected layer of the CNN, according to described embodiments.

Specifically shown here is the Multi-Target MLP 600 architecture having therein an input image 605, leading to the convolutional and pooling layers 610 which then proceed to the Node Fully Connected (FC) Layer of either 256 or 512 nodes as shown at element 615, and then finally the MLP 620 having both the MLP Input layer 555 and the MLP Output Layer 560. The Multi-Target MLP 600 trains a separate multi-target MLP where the inputs are the activations of a fully connected layer of the CNN. The output nodes of the MLP correspond to both the objects and their parts.

As shown here, the output nodes of the MLP correspond to both the objects and their parts.

Figure 6B:
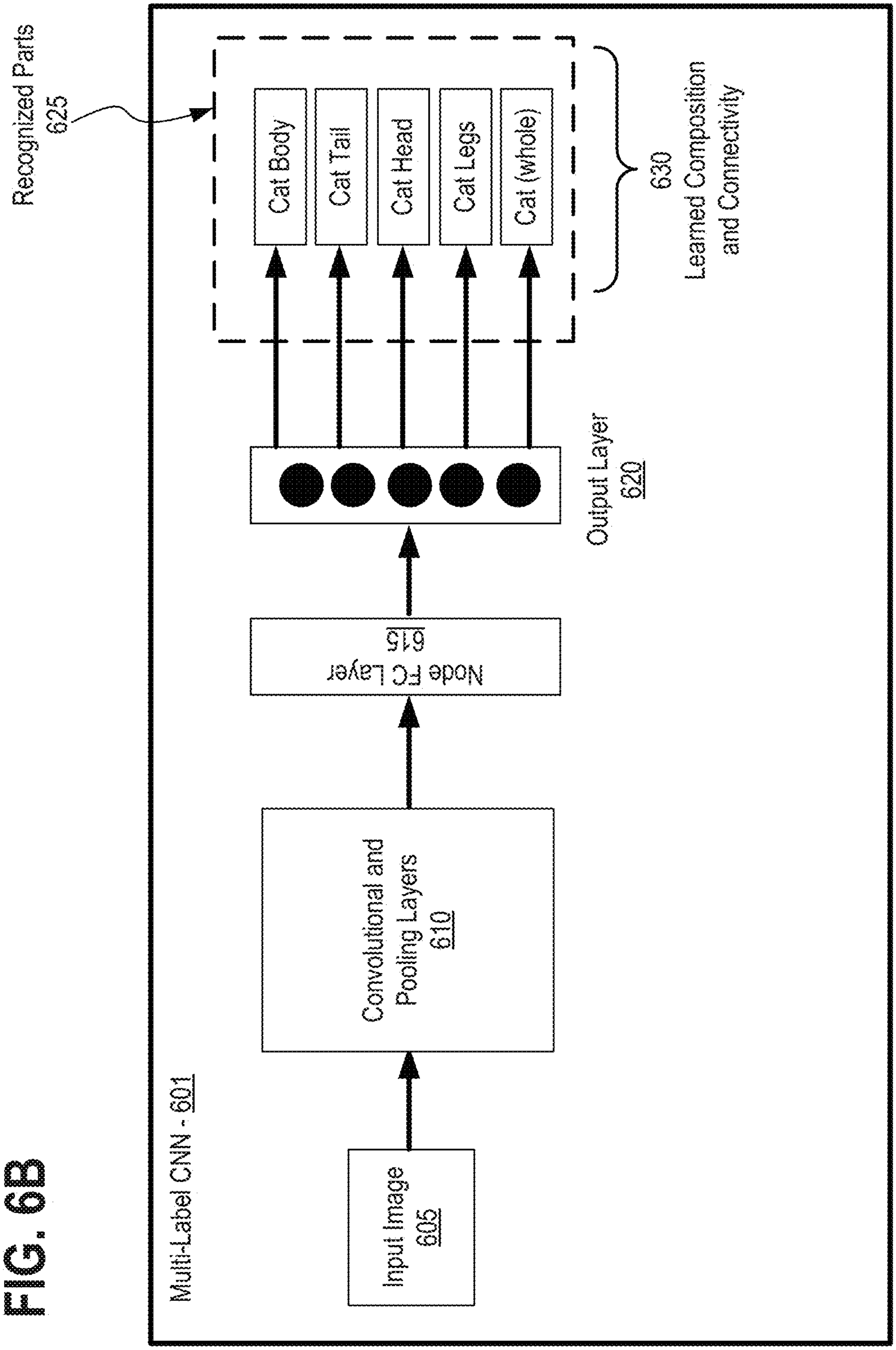
FIG. 6B illustrates training for a multi-label CNN 601 to learn about composition and connectivity along with recognizing objects and parts, according to described embodiments.

FIG. 6B illustrates training for a multi-label CNN 601 to learn about composition and connectivity 630 along with recognizing objects and parts 625, according to described embodiments.

Figure 6C:
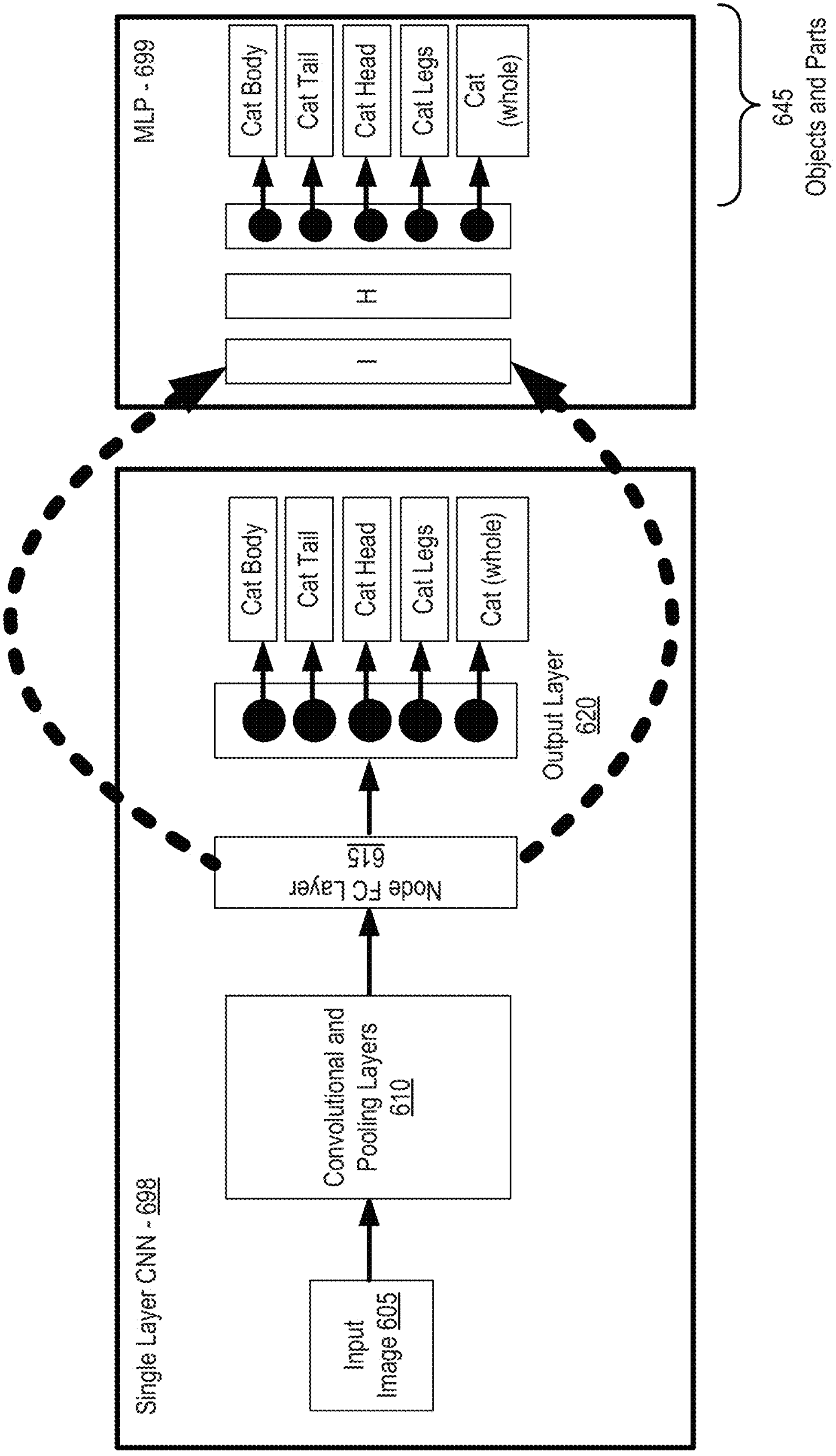
FIG. 6C illustrates training for a single-label CNN to recognize both objects and parts, but not the composition of objects from the parts and their connectivity, according to described embodiments.

FIG. 6C illustrates training for a single-label CNN 698 to recognize both objects and parts 645, but not the composition of objects from the parts and their connectivity, according to described embodiments. Further depicted is the training of a separate multi-label MLP where the inputs are the activations of a fully connected layer of the CNN. As shown here, the MLP learns the composition of objects from parts and their connectivity In experiments, embodiments of the invention generally added just a single fully connected layer of size 512 or 256 to the CNNs, as shown in FIG. 6. The experimental results section below show results from using the activations from these fully connected (FC) layers as input to the MLP. FIG. 6 also shows the general flow of processing to train the MLP: (1) present a training image to the trained CNN, (2) read the activations of the fully connected (FC) layer, (3) use those activations as input to the MLP, (4) set the appropriate multi-target outputs for that training image, and (5) adjust the weights of the MLP using one of the weight adjustment methods.

For example, suppose embodiments of the invention use the activations of a 512-node fully connected (FC) layer as input to the MLP. Further suppose the training image is the face of a cat and the interest is in identifying the following parts: eyes, ears, and mouth. In this case, the target values for the MLP output nodes corresponding to the cat's face, eyes, ears, and mouth will be set to 1. The overall training process for that image will be as follows: (1) input the cat face image to the CNN, (2) read the activations of the 512-node fully connected (FC) layer, (3) use those activations as input to the MLP, (4) set the target outputs for the nodes for face, eyes, ears, and mouth to 1, and (5) adjust the MLP weights as per the weight adjustment method.

Figure 7:
FIG. 7 depicts sample images of different parts of cats, according to described embodiments.

FIG. 7 depicts sample images of different parts of cats according to the described embodiments. Specifically, there are depicted cat heads 705 on the first row, cat legs 710 on the second row, cat bodies 715 on the third row, and cat tails 720 on the fourth row.

Figure 8:
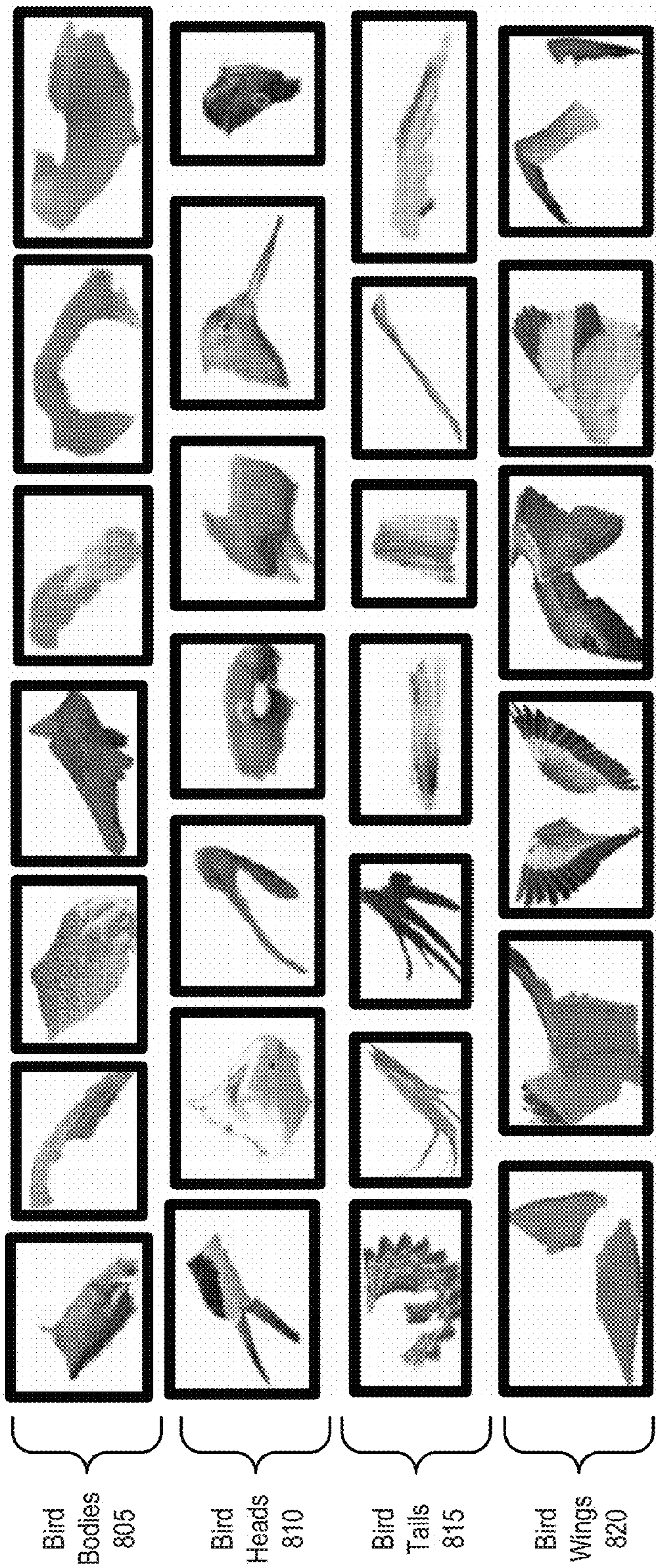
FIG. 8 depicts sample images of different parts of birds, according to described embodiments.

FIG. 8 depicts sample images of different parts of birds according to the described embodiments. Specifically, there are depicted bird bodies 805 on the first row, bird heads 810 on the second row, bird tails 815 on the third row, and bird wings 820 on the fourth row.

Figure 9:
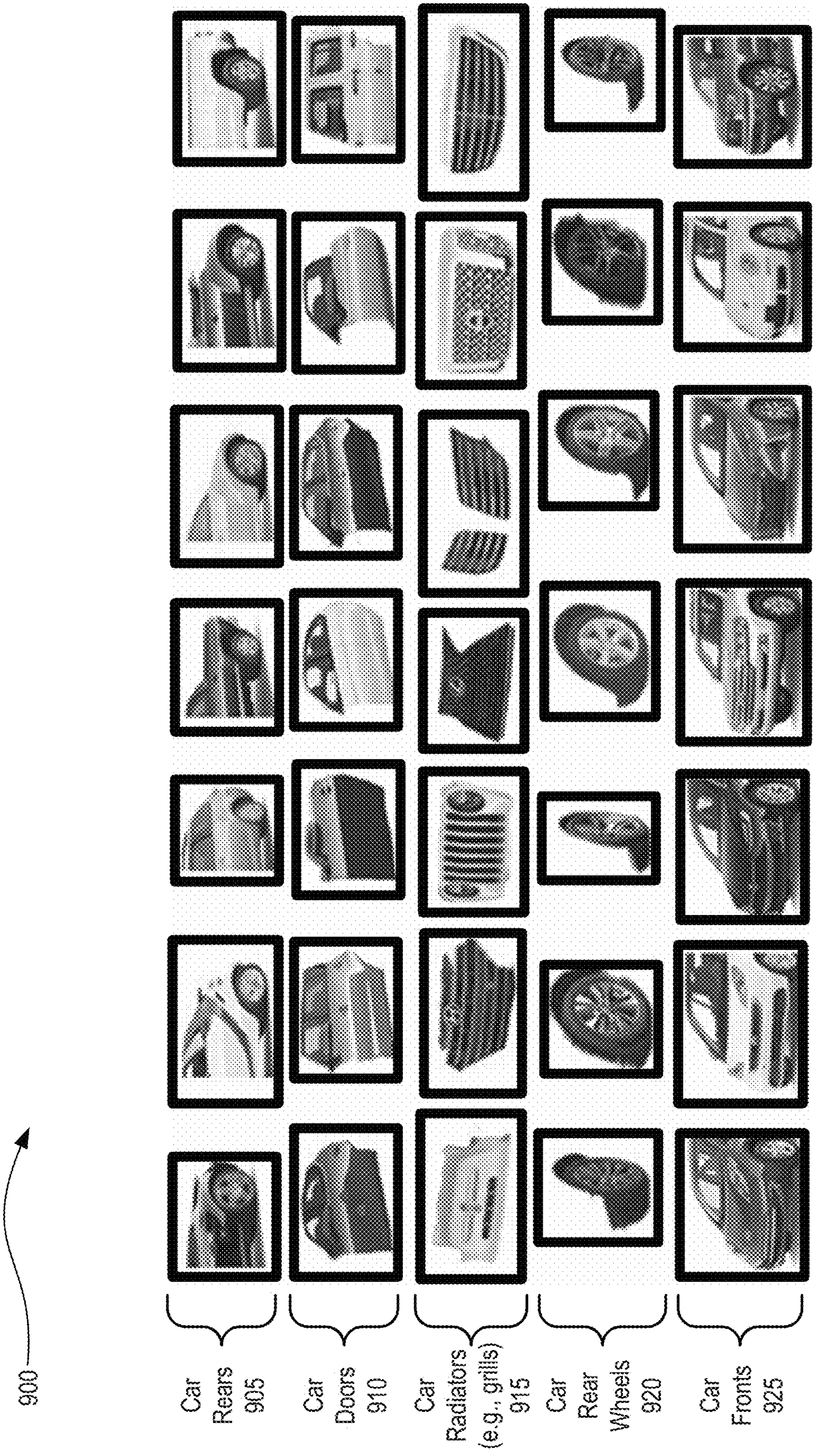
FIG. 9 depicts sample images of different parts of cars, according to described embodiments.

FIG. 9 depicts sample images of different parts of cars according to the described embodiments. Specifically, there are depicted car rears (e.g., the rear portion of cars) 905 on the first row, car doors 910 on the second row, car radiators (e.g., grills) 915 on the third row, car rear wheels 920 on the fourth row, and car fronts (e.g., the front portion of cars) on the fifth row 925.

Figure 10:
FIG. 10 depicts sample images of different parts of motorbikes, according to described embodiments.

FIG. 10 depicts sample images of different parts of motorbikes according to the described embodiments. Specifically, there are depicted motorbike rear wheels 1005 on the first row, motorbike front wheels 1010 on the second row, motorbike handlebars 1015 on the third row, motorbike seats 1020 on the fourth row, motorbike fronts (e.g., the front portion of motorbikes) on the fifth row 1025, and motorbike rears (e.g., the rear portion of motorbikes) on the sixth row 1030.

FIGS. 7, 8, 9, and 10 thus provide exemplary sample images of different parts of cats (head, legs, body, and tail), birds (body, head, tail, and wings), cars (back of cars, doors, radiator grill, back wheels, and car front), and motorbikes (back wheel, front wheel, handle, seat, front part of bike, and rear part of bike) that embodiments of the invention use to train the MLPs for the first problem.

For the second problem, that of recognizing huskies and wolves, embodiments of the invention added two more parts to the list of parts for cats, a similar animal—eyes and ears. So, huskies and wolves had six parts: face or head, legs, body, tail, eyes, and ears.

Figure 11:
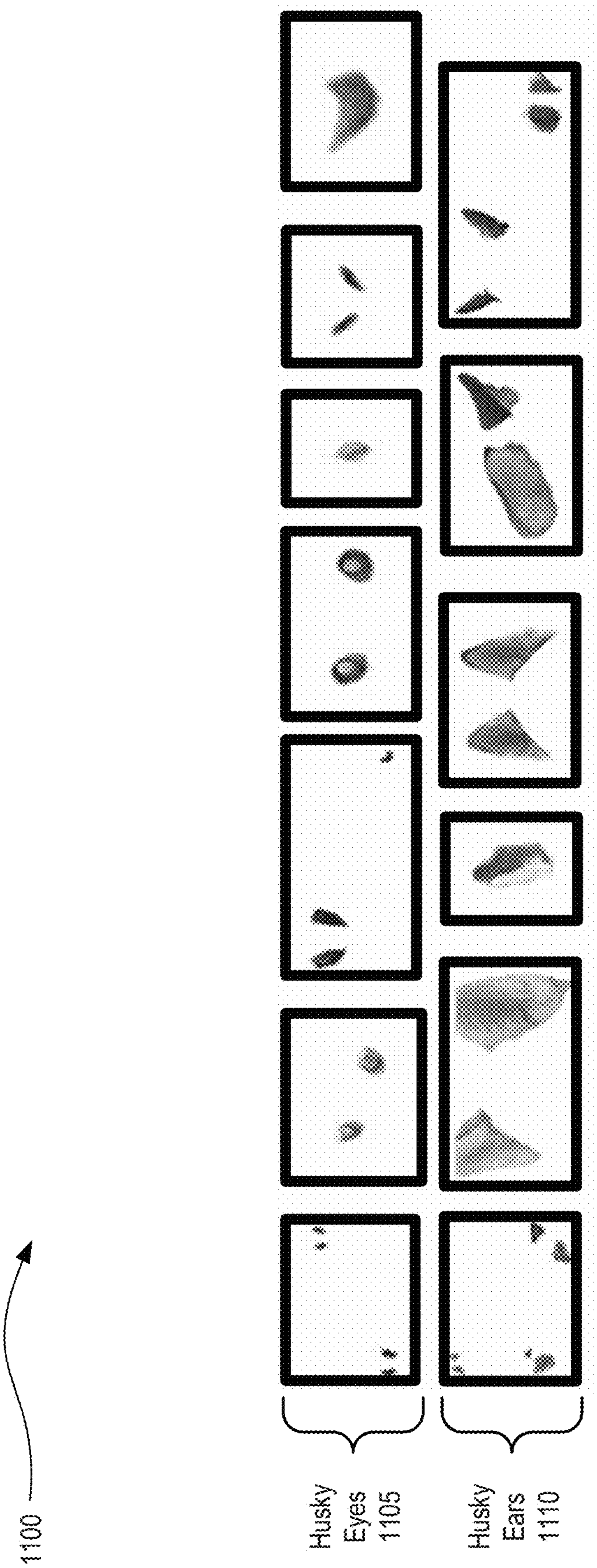
FIG. 11 depicts sample images of Husky eyes and Husky ears, according to described embodiments.

FIG. 11 depicts sample images of Husky eyes 1105 and Husky ears 1110 according to the described embodiments.

Figure 12:
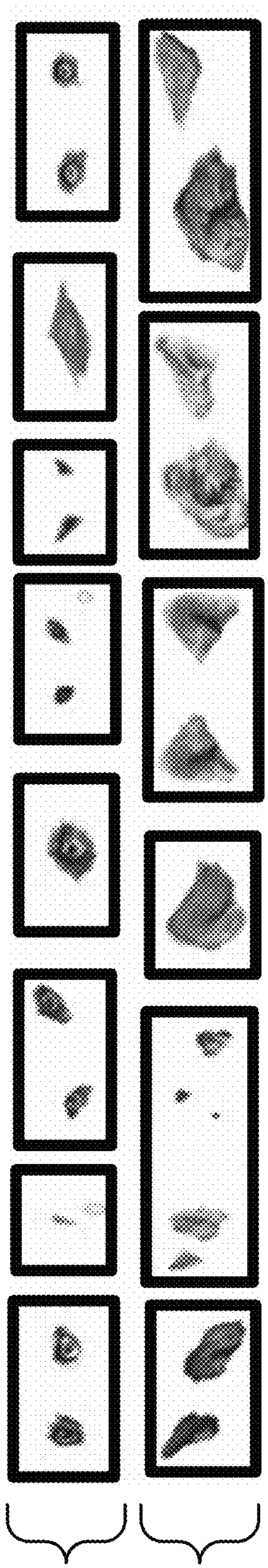
FIG. 12 depicts sample images of Wolf eyes and Wolf ears, according to described embodiments.

FIG. 12 depicts sample images of Wolf eyes 1205 and Wolf ears 1210 according to the described embodiments.

Note that embodiments of the invention annotate the parts by tagging the corresponding object names. Thus, there are "cat heads" and "dog heads" and "husky ears" and "wolf ears." In general, embodiments of the invention let the MLP discover the differences between the similar parts across objects. Embodiments of the invention created many of the part images using Adobe Photoshop. Some, such as "front of bikes" and "back of cars" were simply sliced off from the whole image using Python code. Embodiments of the invention are currently looking into ways of automating this task.

Teaching Composition of Objects from Parts and Connectivity of Parts and Recognizing Object Parts:

To verify the existence of component parts, embodiments of the invention teach the MLP what these parts look like and how they are connected to each other. In other words, embodiments of the invention teach the composition of objects from the component parts and their connectivity. This teaching is at two levels. At the lowest level, to recognize individual elementary parts, embodiments of the invention simply show the MLP separate images of those parts, such as the image of a car door or the eye of a cat. At the next level, to teach how to assemble elementary parts to create subassemblies (e.g., just the face of a cat) or whole objects (e.g., a whole cat), embodiments of the invention simply show the MLP images of the subassemblies or the whole objects and list the parts included in them. Given the part list for an assembly or subassembly and the corresponding image, the MLP learns composition of objects and subassemblies and the connectivity of the parts. Embodiments of the invention provide this part list to the MLP in the form of multi-target outputs for the image, as explained before. For instance, for the image of a cat's face, and when the parts of interest are the eyes, ears, nose, and mouth, embodiments of the invention set the target values for the output nodes of those parts to 1 and the rest to 0. If it is the whole image of a cat, embodiments of the invention list all the parts-such as the face, legs, tail, body, eyes, ears, nose, and mouth—by setting the target values of the corresponding output nodes to 1 and the rest to 0. Thus, setting the target output values of the output nodes appropriately in a multi-target MLP model is one way of listing parts of an assembly or subassembly. Of course, it is only necessary to list the parts of interest. If one is not interested in verifying that there is a tail, then one need not list that part. However, the longer the list of parts, then the better the verification will be for the object in question.

Explainable AI by Construction:

According to embodiments, the user is both the architect and builder of the Explainable AI (XAI) model and it depends on the parts of objects that are of interest and important to verify. For example, in the experiment with cat and dog images (results are in Section 5), embodiments of the invention just used four features: body, face or head, tail, and legs. For the case of huskies and wolves (results are in Section 5), embodiments of the invention used six features: body, face or head, tail, legs, eyes, and ears. It is possible that one can get higher accuracy with verification of more features or parts of objects.

The output layer of the MLP essentially comprises the base of the symbolic model. The activation of an output node beyond a certain threshold indicates the presence of the corresponding part (or object). That activation, in turn, sets the value of the corresponding part symbol (e.g., the symbol that represents a cat's eye) as TRUE, indicating recognition of that part. One can build various symbolic models for object recognition based on the symbolic outputs of the MLP output layer. In one extreme form, to recognize an object, one can insist on the existence of all parts of an object in the image. Or relax that condition to handle situations when an object is only partially visible in an image. For partially visible objects, one must decide based on the evidence at hand. In another variation, one can put more emphasis on verification of certain parts. For example, to predict that an object is a cat, one can insist on the visibility of the head or face and verification that it is of a cat. Making a prediction based on recognizing other parts of a cat may not be acceptable in this case.

Embodiments of the invention present here one symbolic model based on counting of verified parts. Let $P_{i,k}$, k=1 . . . . NPi, i=1 . . . . NOB, denote the $k^{th}$ part of the $i^{th}$ object class, $NP_i$ the total number of parts in the $i^{th}$ object class, and NOB the total number of object classes. Let $P_{i,k}=1$ when the object part is verified to exist and =0 otherwise. Let $PV_i$ denote the total number of verified parts of the $i^{th}$ object class, and PV; min the minimum number of part verifications required to classify an object as being of the $i^{th}$ object class. The general form of this symbolic model based on counts of verified (recognized) parts of objects according to equations (1) and (2), as follows:

IF $PV_i \geq PV_i^{min}$ THEN the $i^{th}$ object class is a candidate class for recognition, where  Equation (1)

$$PV_i = \sum\nolimits_{-(k=1)}^{\wedge NPi} (P_{i,k} \text{ is visible and recognized}).$$ Equation (2)

The predicted class would be the class with the maximum $PV_i$ provided it satisfies condition as set forth at equation (1), according to equation (3), as follows:

$$\text{Predicted object class } PO = \text{argmax}_i\, (PV_i).$$ Equation (3)

If verification of certain parts is critical to prediction, then equation (2) will count only those parts. Note again that part counting is at the symbolic level.

Algorithm: To simplify notations, embodiments of the invention let $P_{i,k}$ denote both elementary object parts (e.g., an eye or an ear) and more complex object parts that are assemblies of the elementary parts (e.g., a husky face that consists of eyes, ears, nose, mouth and so on). Let $M_i$ denote the set of original training images for the $i^{th}$ object class and M the total set of training images.

Thus, M would consist of object images of the type shown in FIGS. 2 and 3. Let $MP_{i,k}$, k=1 . . . $NP_i$, i=1 . . . C, denote the set of object part images available for the $k^{th}$ part of the $i^{th}$ object class and MP the total set of object part images. Thus, MP would consist of object part images of the type shown in FIGS. 7 through 12. Embodiments of the invention create these MP object part images from the M original images. Let MT={M U MP} be the total set of images. Embodiments of the invention use the M original images to train and test the CNN and the MT images to train and test the MLP.

Let $FC_j$ denote the $j_{th}$ fully connected (FC) layer in a CNN and J the total number of FC layers. Embodiments of the invention currently use the activations of one of the FC layers as input to the MLP, but one can use multiple FC layers also. Suppose embodiments of the invention select the $j^{th}$ FC layer to provide the input to the MLP. In this version of the algorithm, embodiments of the invention train the MLP to decode the activations of the $j^{th}$ FC layer to find the object parts.

Let $T_i$ represent the target output vector for the $i^{th}$ object class for the multi-target MLP. $T_i$ is a 0-1 vector denoting the presence or absence of the object and its parts in an image. For example, for a cat defined by the parts legs, body, tail and head, this vector is of size 5. And a cat output vector can be defined as [cat object, legs, head, tail, body] as shown in FIG. 5. For a whole cat image with all the parts visible, this target output vector would be [1, 1, 1, 1, 1]. If the tail of the cat is not visible, this vector would be [1, 1, 1, 0, 1]. Embodiments of the invention used the following parts for a husky: Husky_Head, Husky_Tail, Husky_Body, Husky_Leg, Husky_Eyes, Husky_Ears. Thus, the output vector size is 7 for a husky and can be defined as: [husky object, Husky_Head, Husky_Tail, Husky_Body, Husky_Leg, Husky_Eyes, Husky_Ears]. For a husky head image, this vector would be [0, 1, 0, 0, 0, 1, 1]. Note that embodiments of the invention just list the parts that are visible. And since it is just the husky head, embodiments of the invention set the husky object target value in the first position to 0. Generally, the $T_i$ vector has the object in the first position and the part list following that. These object class output vectors $T_i$ combine to form the multi-target output vector for the MLP as shown in FIG. 5. For the cat and dog problem of FIG. 5, the multi-target output vector is of size 10. For a whole cat image, it would be [1, 1, 1, 1, 1, 0, 0, 0, 0, 0]. For an entire dog image e.g., as a whole), it would be [0, 0, 0, 0, 0, 1, 1, 1, 1, 1].

Let $IM_k$ be the $k^{th}$ image in the total image set MT that consists of both the M object images and the MP part images. Let $TR_k$ be the corresponding multi-target output vector for the $k^{th}$ image.

To train the MLP with both the original M images and the MP part images, each image $IM_k$ is first input to the trained CNN and the activations of the designated $j^{th}$ FC layer recorded. The $j^{th}$ FC layer activations then become the input to the MLP with $TR_k$ being the corresponding multi-target output variable.

The general form of the algorithm is as follows:

Step 1:

Train and test a convolutional neural network (CNN) with a set of fully connected (FC) layers using M images of C object classes. Here, one can train a CNN from scratch or use transfer learning with added FC layers.

Step 2:

Train a multi-target MLP using a subset of the MT images, where for each training image $IM_k$:

Input the image IMk to the trained CNN,

Record the activations at the designated $j^{th}$ FC layer,

Input the activations of the $j^{th}$ FC layer to the MLP,

Set $TR_k$ as the multi-target output vector for the image $IM_k$,

Adjust MLP weights using an appropriate weight adjustment method.

Experimental Setup and Results

Experimental Setup:

Embodiments of the invention tested embodiments of the invention approach to XAI on three problems with images from the following classes of objects: (1) cars, motorbikes, cats, and birds, (2) huskies and wolves, and (3) cats and dogs. The first problem has images from four distinct classes and is somewhat on the easier side. The other two problems have objects that are somewhat similar and are closer to being fine-grained image classification problems. Table 1 shows the number of images used for training and testing CNNs and MLPs. Embodiments of the invention used some augmented images to train both the CNNs and the MLPs. Embodiments of the invention used object part images only to train and test the multi-target (multi-label) MLPs.

FIG. 13 depicts Table 1 at element 1300 which shows who learns what in the CNN+MLP architectures, according to described embodiments. The multi-label ones learn the composition and connectivity between objects and parts.

FIG. 14 depicts Table 2 at element 1400 which shows the number of images (original plus augmented) used to train and test CNNs and MLPs. Embodiments of the invention used the object part images only to train and test the multi-target MLPs.

Embodiments of the invention used the Keras software library both for transfer learning with ImageNet-trained CNNs and for building separate MLP models and used Google Colab to construct and run the models.

For transfer learning, embodiments of the invention used ResNet, Xception, and VGG models. For transfer learning, embodiments of the invention essentially froze the weights of the convolutional layers, then added a fully connected layer after the flattening layer, followed by the output layer, as shown in FIG. 4 above. Embodiments of the invention then trained the weights of the fully connected layers for the new classification task.

Embodiments of the invention added only one fully connected (FC) layer, of size either 512 or 256, between the flattening layer and the output layer, along with dropouts and batch normalization. The output layer had softmax activation functions along with ReLu activations for the FC layer. Embodiments of the invention tested the approach with two different fully-connected (FC) layers (512 and 256) to show that encoding for object parts does exist in the FC layers of different sizes and the part-based MLP can appropriately decode them. Embodiments of the invention trained the CNNs for 250 epochs using the RMSprop optimizer with "categorical_crossentropy" as the loss function. Embodiments of the invention also created a separate test set and used that as the validation set. Embodiments of the invention used 20% of the total dataset for testing both the CNNs and MLPs.

The MLPs had no hidden layers. They had inputs directly connected to the multi-label (multi-target) output layer. For MLP training, every image, including the object part images, was first passed through the trained CNN and the output of the 512 or 256 FC layer recorded. That recorded 512 or 256 FC layer output then became the input to the MLP. Embodiments of the invention used the sigmoid activation function for the MLP output layer. Embodiments of the invention trained the MLPs also for 250 epochs using the "adam" optimizer with "binary_crossentropy" as the loss function because it is a multi-label classification problem.

Embodiments of the invention used a slight variation of equation (2) to classify objects with the MLP. Embodiments of the invention simply summed up the sigmoid activations of each object class node and the corresponding nodes of its parts and then compared the summed output of all object classes to classify the image. The object class with the highest summed activations becomes the predicted object class. In this variation, embodiments of the invention let $P_{i,k}$=sigmoid activation value, which is between 0 and 1, where $P_{i,k}$, k=1 . . . . $NP_i$, i=1 . . . . NOB, denotes the $k^{th}$ part of the $i^{th}$ object class, NP; the total number of parts in the $i^{th}$ object class, and NOB the total number of object classes. Here, embodiments of the invention use the interpretation that the sigmoid output value represents the probability of the existence of that object part, according to equation (4) and equation (5), as follows:

Equation (4)

$$PV_i = \sum\nolimits_{-(k=1)}^{\wedge NPi} (P_{i,k} = \text{sigmoid output value of the corresponding output node})$$

Equation (5)

$$\text{Predicted object class } PO = \text{argmax}_i\,(PV_i),$$

where $PO$ is the predicted object class.

Experimental Results on Naming of Object Parts:

Embodiments of the invention present results here for the three problems embodiments of the invention solved to test our approach to XAI. Embodiments of the invention named similar object parts (e.g., legs of cats and dogs) with different names such that the MLP would try to find discriminating features that make them different. For example, embodiments of the invention named huskies parts as "husky legs," "husky body," "husky heads," "husky eyes," and so on. Similarly, embodiments of the invention named wolf parts as "wolf legs," "wolf body," "wolf head," "wolf eyes," and so on. Since huskies are probably well groomed by their owners, their parts should look different from those of wolves.

Embodiments of the invention used the following object part names for the three problems.

a) Object classes—Cars, motorbikes, cats, and birds:

- Car part names—Back_car, Door_car, Radiator_grill_car, Roof_car, Tires_car, Front_car;
- Cat part names—Cat_Head, Cat_Tail, Cat_Body, Cat_Legs;
- Bird part names—Bird_Head, Bird_Tail, Bird_Body, Bird_Wing; and
- Motorbike part names—Front_bike, Back_bike, Seat_bike, Back_Wheel_bike, Front_Wheel_bike, Handle_bike.

b) Object classes—Cats, Dogs

- Cat part names—Cat_Head, Cat_Tail, Cat_Body, Cat_Legs; and
- Dog part names—Dog_Head, Dog_Tail, Dog_Body, Dog_Legs.

c) Object classes—Huskies, Wolves

- Husky part names—Husky_Head, Husky_Tail, Husky_Body, Husky_Leg, Husky_Eyes, Husky_Ears; and
- Wolf part names—Wolf_Head, Wolf_Tail, Wolf_Body, Wolf_Leg, Wolf_Eyes, Wolf_Ears.

Classification Results Using the XAI-MLP Model

FIG. 15 depicts Table 3 at element 1500 showing results for the "cars, motorbikes, cats, and birds" classification problem, according to the described embodiments.

FIG. 16 depicts Table 4 at element 1600 showing results for the "cats vs. dogs" classification problem, according to the described embodiments.

FIG. 17 depicts Table 5 at element 1700 showing results for the "huskies and wolves" classification problem, according to the described embodiments.

FIG. 18 depicts Table 6 at element 1800 showing results comparing the best prediction accuracies of the CNN and XAI-MLP models, according to the described embodiments.

Each of Tables 2, 3, and 4 show the classification results. In these tables, columns A and B have the training and test accuracies of ResNet50, VGG19 and Xception models with two different FC layers, one with 512 nodes and the other with 256 nodes. Each one, the one with the FC-512 layer and the other with the FC-256 layer, is a separate model and embodiments of the invention trained and tested them separately. Hence, the accuracies might be different. Columns C and D show the training and test accuracies of the corresponding XAI-MLP models. Note that when embodiments of the invention train a CNN model with a FC-256 layer, the XAI-MLP model uses the FC-256 layer output as input to the MLP. And embodiments of the invention set up the XAI-MLP as a multi-label (multi-target) classification problem with output nodes corresponding to both objects and their parts. Thus, for a whole cat image, embodiments of the invention set the target values to 1 for the "cat" object output node and the corresponding part output nodes (for Cat_Head, Cat_Tail, Cat_Body, and Cat_Head). For the image of a husky head, embodiments of the invention set the target values to 1 for the part output nodes "Husky_Head," "Husky_Eyes," and "Husky_Ears." This is essentially how embodiments of the invention teach the XAI-MLP composition and connectivity of the objects and their parts. Embodiments of the invention do not provide any location information for the parts.

Column E in the tables show the difference in test accuracies between the XAI-MLP and CNN models. In most cases, the XAI-MLP model has a higher accuracy. There is an inherent tradeoff between predictive accuracy and explainability. Although embodiments of the invention need to perform more experiments to make a definitive statement on this question, from these limited experiments, it appears that embodiments of the invention can get increased predictive accuracy with part-based explainable models. Table 5 compares the best test accuracies of the CNN models with that of the XAI-MLP models. On the two fine-grained problems (cats vs. dogs, huskies vs. wolves), XAI-MLP models provide a significant increase in predictive accuracy.

Figure 19:
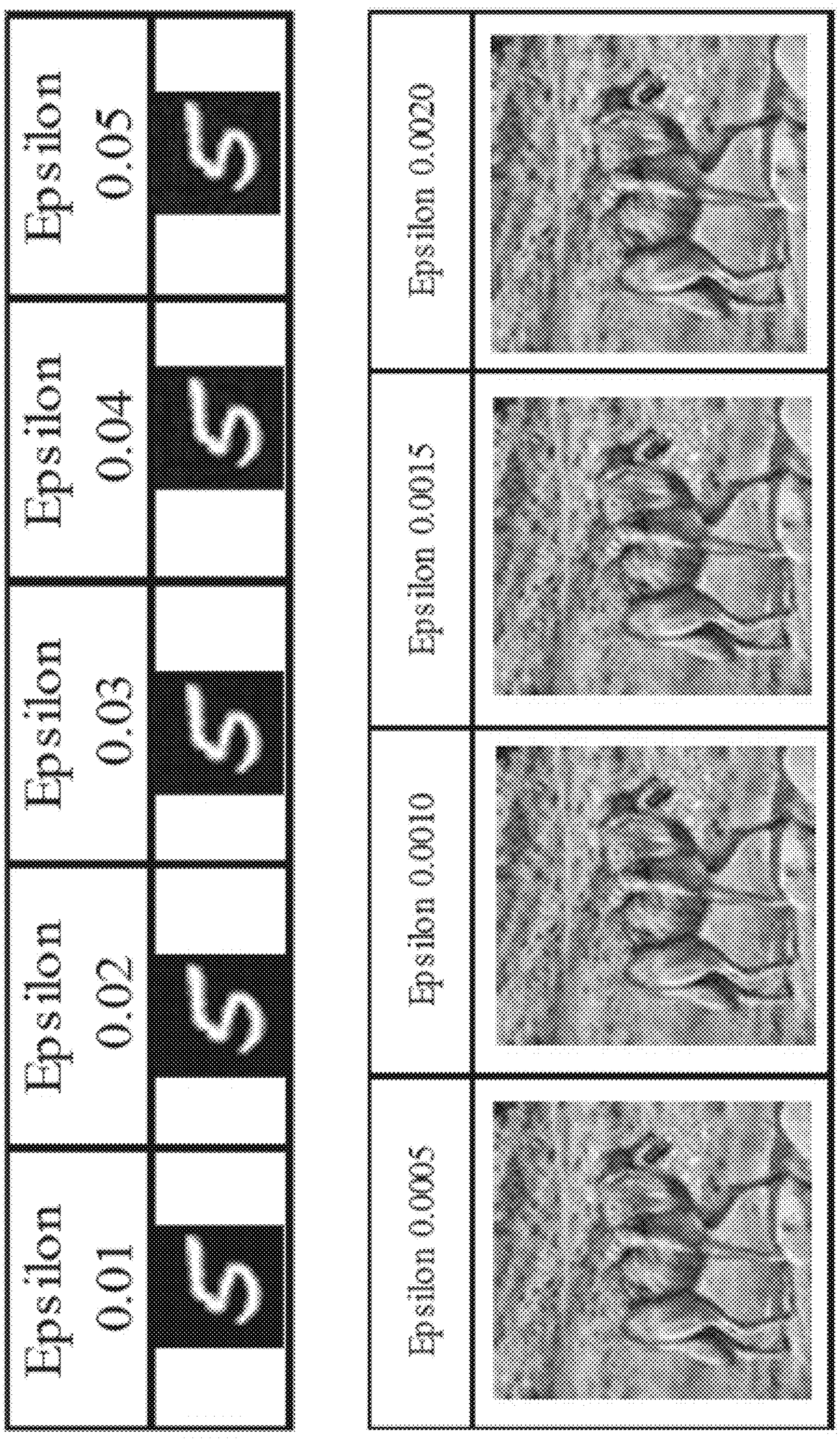
FIG. 19 depicts the digit "5" having been altered by the fast gradient method for different epsilon values and also a wolf image having been altered by the fast gradient method for different epsilon values, according to the described embodiments.

FIG. 19 depicts the digit "5" having been altered by the fast gradient method for different epsilon values and also a wolf image having been altered by the fast gradient method for different epsilon values, according to the described embodiments.

Explainable AI Robustness to Adversarial Attacks:

The Explainable AI model was tested against adversarial attacks using the fast gradient method. Specifically, the Explainable AI model was tested on two problems: (1) distinguishing handwritten digits using the MNIST dataset, and (2) distinguishing huskies from wolves using the dataset from the experiment described previously.

On Adversarial Image Generation—In these tests, the focus was on minimal adversarial attacks that humans cannot easily detect (e.g., one-pixel attacks). In other words, the altered image may force a model to predict something wrong, but a human would not see any difference with the original image. Epsilon is a hyper-parameter in the fast gradient algorithm that determines the strength of the adversarial attack; higher epsilon values cause a greater obfuscation of pixels, often beyond human recognition.

To ensure low visual degradation, different epsilon values were experimented with to determine values that would affect the accuracy of the basic CNN model, but the images would still appear substantially the same to a human. It was found that the minimum epsilon value for MNIST was about 0.01 to influence the basic CNN model's accuracy.

The following epsilon values were therefore tested, starting with the minimum, on both the basic CNN model and the XAI-CNN model: 0.01, 0.02, 0.03, 0.04, and 0.05.

For the huskies and wolves problem, the minimum epsilon value was 0.0005. Thus, the following epsilon values were attempted: 0.0005, 0.0010, 0.0015, and 0.0020.

Five different epsilon values were used for MNIST, compared to four for huskies and wolves, simply to show the reduction in accuracy with the higher epsilon value of 0.05 for MNIST.

Note that the difference in the epsilon values for the two problems is due to the difference in the image backgrounds. An MNIST image has a plain background, whereas images of huskies and wolves appear in natural environments, such as a forest, a park, or a bedroom. MNIST images thus require more perturbations to produce misclassifications.

Sample images from MNIST and huskies and wolves datasets are depicted for different epsilon values. Notice that a cursory inspection does not reveal any difference between the images.

MNIST—Handwritten Digit Recognition:

The data—From the MNIST dataset of approximately 60,000 images a subset of 6,000 images were sampled per digit. These were then split them in half for training and testing. For digit parts, the top and bottom halves were cut out, then the left and right halves, and then each of the samples were subjected to a diagonal cut. This resulted in 6 part images per digit image. That produced 6,000 images per part type (e.g., top half) for each digit class (e.g., a 5) for a total of 42,000 [=(6 part+1 whole image)*6000] images per digit type. Including the parts, there were 70 image classes for the 10 digits in the XAI model.

Figure 20:
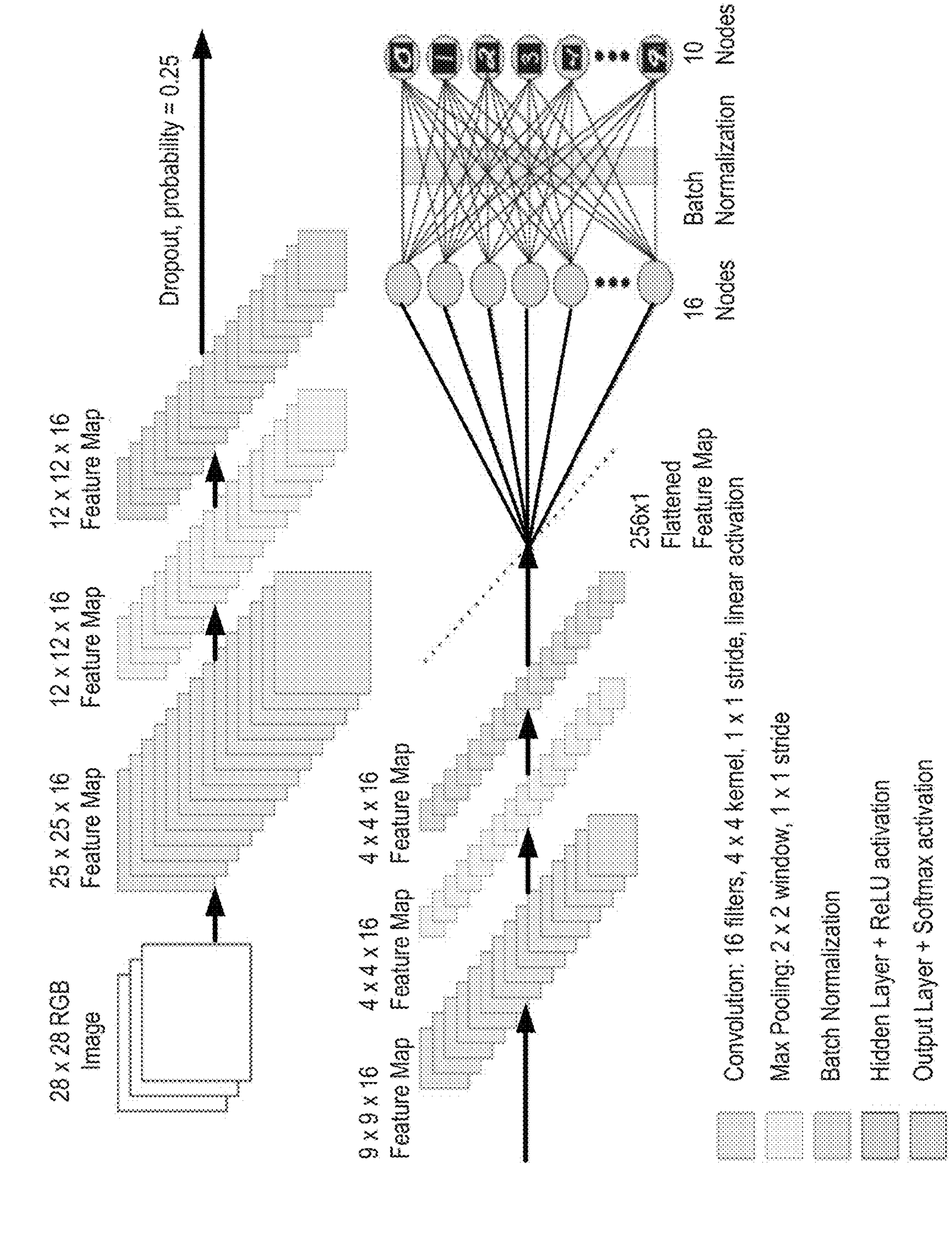
FIG. 20 depicts an exemplary base CNN model utilizing a custom convolutional neural network architecture for MNIST, according to the described embodiments.

FIG. 20 depicts an exemplary base CNN model utilizing a custom convolutional neural network architecture for MNIST, according to the described embodiments.

Figure 21:
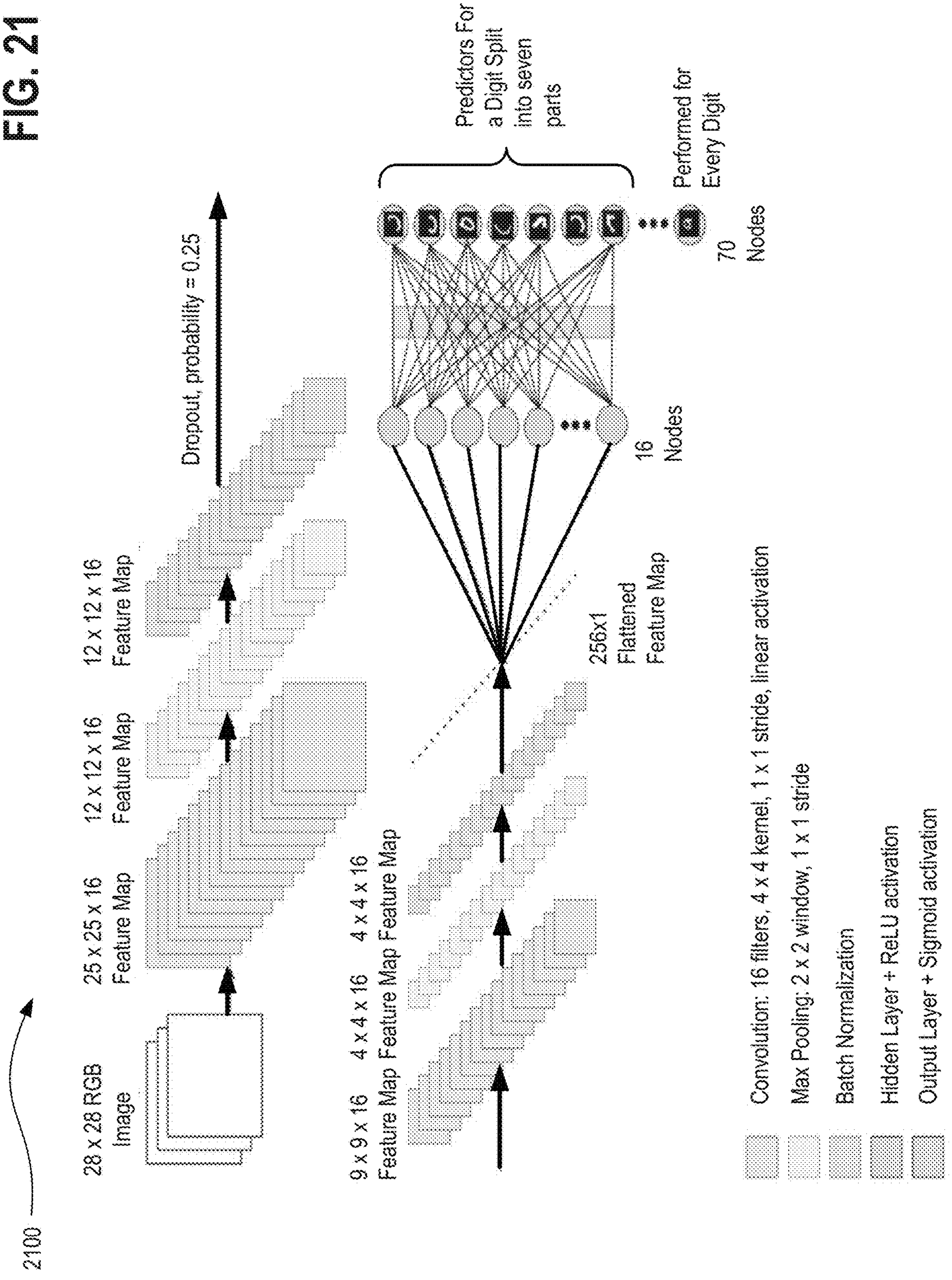
FIG. 21 depicts an exemplary base XAI-CNN model utilizing a custom convolutional neural network architecture for MNIST explainable AI model, according to the described embodiments.

FIG. 21 depicts an exemplary base XAI-CNN model utilizing a custom convolutional neural network architecture for MNIST explainable AI model, according to the described embodiments. Notably, the predictions rendered for any given digit are split into seven parts. Specifically, the bottom, diagonal, bottom half, complete digit, left half, right half, top diagonal, and lastly the top half. This prediction is performed for every digit, ultimately ending with the final part, the top half, for the digit in question (the digit "9" as depicted in the example).

FIG. 22 depicts Table 7 at element 2200 showing average test accuracies of the MNIST base CNN model, over 10 different runs, for adversarial images generated by different epsilon values, according to the described embodiments.

FIG. 23 depicts Table 8 at element 2300 showing average test accuracies of the XAI-CNN model, over 10 different runs, for adversarial images generated by different epsilon values, according to the described embodiments.

FIG. 24 depicts Table 9 at element 2400 showing average test accuracies of the Huskies and Wolves base CNN model, over 10 different runs, for adversarial images generated by different epsilon values, according to the described embodiments.

FIG. 25 depicts Table 10 at element 2500 showing average test accuracies of the Huskies and Wolves XAI-CNN model, over 10 different runs, for adversarial images generated by different epsilon values, according to the described embodiments.

The model architecture and results—For adversarial testing, the architecture of FIG. 6A was utilized for the Explainable model. This model uses a multi-label CNN model with no additional MLPs. The model set forth at FIG. 6B shows the custom-built single-label CNN model that as used as the base model for MNIST. This base model was trained with whole images, but not with any of the part images. It has an output layer with 10 nodes for the 10 digits with softmax activation functions. The results of the explainable XAI-CNN model were compared as shown by FIG. 20 which depicts the base CNN model. Specifically, the multi-label XAI-CNN model was trained with both whole and part images of the digits.

For testing, the base CNN model was trained ten times, each time for 30 epochs, using the categorical cross entropy loss function and the adam optimizer. The base CNN model was tested with adversarial images generated with different epsilon values. Table 7 as set forth at FIG. 22 shows the average test accuracies on the adversarial images over 10 different runs for different epsilon values.

The explainable AI model (XAI-CNN) as depicted by FIG. 21 has the same network structure as the base model of FIG. 21, with key differences being: (1) the number of nodes in the output layer now being 70 rather than only 10, (2) the output layer activation function (now utilizing sigmoid), and (3) the loss function being binary cross entropy. The other main difference is that the XAI-CNN model is a multi-label model with 70 output nodes, 7 output nodes per digit, where 6 of those 7 nodes belong to different parts of the digit.

The model was tested with adversarial images generated using the XAI-CNN model with different epsilon values. Table 8 as set forth at FIG. 23 shows the average test accuracies for the XAI-CNN model over 10 different runs for different epsilon values.

The data—For huskies and wolves, the same dataset was again used as in the experiments described previously.

The model architecture and results—As usual, for adversarial tests, the architecture of FIG. 6A was used for the Explainable model. However, unlike MNIST, an Xception model was utilized in this case for transfer learning. For transfer learning, the processing does freeze the weights of the convolutional layers, then adds a flattening layer, followed by a fully connected (FC) layer and then an output layer. The weights of the fully connected layer were then trained for the new classification task.

The base CNN model is always a single-label classification model. The base CNN model was trained, consisting of the Xception model plus the added layers, with whole images of huskies and wolves. It had an output layer with two nodes with softmax activation functions.

In the case of the explainable AI model (XAI-CNN) of FIG. 6A, a multi-label model, there were 14 output nodes with sigmoid activation functions. The multi-label model was then trained with both whole and part images of huskies and wolves. The loss functions and optimizers used were the same as for MNIST. Both the base CNN model and the XAI-CNN model were trained 10 times for 50 epochs. The models were tested with adversarial images generated using the respective model with different epsilon values. Table 9 as set forth at FIG. 24 shows the average test accuracies for the base CNN model on the adversarial images over 10 different runs for different epsilon values. Table 10 as set forth at FIG. 25 shows the same for the XAI-CNN model.

Adversarial Attack Results-Tables 7 and 8 (see FIGS. 22 and 23) show that both the base CNN and the XAI-CNN models have an accuracy of about 98% for MNIST images without any distortions (epsilon=0). However, for the Base CNN, the mean accuracy drops to 85.89% for epsilon of 0.05. In contrast, the XAI-CNN model's accuracy drops from 97.97% to 97.71% for epsilon 0.05. The drop in accuracy for the base CNN model is 12.5%, whereas it is only 0.26% for the XAI-CNN model.

Tables 9 and 10 (see FIGS. 24 and 25) show the average accuracies for the huskies and wolves dataset. Table 9 shows that the average accuracy of the base CNN model drops to 45.52% for epsilon 0.002 from 88.01% at epsilon 0. Table 10 shows that the average accuracy of the XAI-CNN model drops to 83.35% for epsilon 0.002 from 85.08% at epsilon 0. Thus, the base CNN model's accuracy drops 45.52% compared to XAI-CNN model's drop of just 1.73%.

Overall, these results show that the DARPA-style explainable models are relatively unaffected by low level adversarial attacks compared to regular CNN models. This is mainly because the multi-label model is checking on the parts of objects and cannot be easily fooled.

Explainability Evaluation:

Since the objects-parts explainability framework described here is constructive and user-defined, it is the responsibility of the user to measure the adequacy of an explanation. At one extreme, a user might define the explanation using a minimal number of parts, thereby keeping the explanation simple that is also consistent with the performance of the system. For example, to predict that the image is one of a cat, verifying that the face is that of a cat is good enough. At the other extreme, a user might define the explanation with many parts with some redundancy built in. For example, to predict that it is an image of a cat, a user might want verification of many details—from ears, eyes and tail to whiskers, claws, and face. For critical applications, such as in medicine and defense, it would be reasonable to assume that a team would define what parts should be verified for necessary and sufficient explanation. In summary, the onus of evaluation of the explanation is on the user and the user must verify that the explanation is consistent with the predictions of the system. This part-based framework provides the freedom to construct an explanation according to the particular implementation requirements and necessary objectives or desires as specified by the user.

CONCLUSIONS

Embodiments of the invention presented here an approach to Explainable AI that is about identifying parts of objects in images and predicting the type (class) of an object only after verifying the existence of certain parts of that object type in the image. The original DARPA conception of a symbolic XAI model was this part-based model. In the embodiments described herein, the user defines (designs) the XAI model in the sense that the user must define the object parts that he/she wants to verify for object prediction.

Embodiments of the invention build the XAI symbolic model by decoding a CNN model. To create the symbolic model, embodiments of the invention use CNN and MLP models that remain as black boxes. In the work presented here, embodiments of the invention kept the CNN and MLP models separate to understand decoding of parts from a fully connected layer of the CNN. However, one can unify the two models into a single model.

Embodiments of the invention demonstrated in this work that one can easily teach the composition of objects from parts by simply using a multi-label (multi-target) classification model and by showing individual object parts. By using a multi-label classification model, embodiments of the invention avoid showing the exact location of the parts. Embodiments of the invention let the learning system figure out the connectivity between parts and their relative locations.

Creating and annotating object parts is currently a tedious manual process. Embodiments of the invention are currently exploring ways to automate the process so that embodiments of the invention can extract many annotated parts from a variety of images once embodiments of the invention give the system a small, annotated set for training. Once embodiments of the invention develop such a method, embodiments of the invention should be able to perform some large-scale testing of our approach. In this paper, embodiments of the invention just wanted to introduce the fundamental ideas and demonstrate, with some limited experiments, that they work and can produce symbolic XAI models.

It appears from experiments thus far that part verification based predictive models can potentially increase predictive accuracy, but more experiments are needed to confirm this claim. Given that humans identify objects from their parts, this conjecture makes sense.

It is also possible that part-based object verification can provide protection from adversarial attacks, although this conjecture also requires experimental verification. If embodiments of the invention can verify this conjecture, then adversarial learning might become unnecessary.

Overall, part based symbolic XAI models can not only provide transparency to our CNN models for image recognition, but also have the potential to provide increased predictive accuracy and protection against adversarial attacks.

Solution to Technical Problems

Within the context of new AI technologies there is a need for the development of processing solutions for UAV (Unmanned Aerial Vehicle) images and video as well as and CCTV (Closed-Circuit Tele Vision) images and video which remains unmet even by the latest state of the art and currently available technologies.

Deep learning is the most current technology for video processing. However, deep learning models are hard to understand due to their lack of transparency. Hence, there is a growing concern with respect to deploying them in highly risky situations where wrong decisions can result in legal liability. For example, fields such as medicine are hesitant to deploy the use of deep learning models and technology to automate the reading and interpretation of images in radiology due to the obvious risk to human life in the event of a wrong decision or faulty diagnosis. The same types of risk exist in automating video processing with deep learning for CCTVs and UAVs, in which wrong decisions with black-box (e.g., non-transparent) models will have potentially negative consequences.

Since deep learning models have high accuracies, there is ongoing research to make them explainable and transparent. DARPA started the Explainable AI program because critical DoD applications have enormous consequences and cannot use black-box models. NSF also has applied significant funding to explainability research.

Currently, computer vision has some explainable methods. However, the dominant technologies, such as LIME, SHAP, and Grad-CAM, each depend upon visualization, which means that a human is needed in each instance to look at the images. Therefore, it simply is not possible to create systems using those prior known technologies which are capable of automated video processing "without human intervention," using such methods. Thus, innovative solutions are critically needed to overcome the current limitations.

New AI Technologies are Needed:

Creating symbolic models from deep learning models would be a significant innovation to produce transparent models.

Symbolic models: DARPA's part-based explanation idea provides a good framework for symbolic models. For example, using the DARPA framework, a logical rule to recognize a cat may be as follows:

IF the Fur is of a Cat AND the Whiskers are of a Cat AND the Claws are of a Cat THEN it is a Cat.

Here, cat, fur, whiskers, and claws are abstract concepts represented by their corresponding namesake symbols and a modified deep learning model can output TRUE/FALSE values for these symbols indicating the presence or absence of these parts in the image. The logical rule above is a symbolic model that is easily processed by a computer program; no visualization needed; and there is no need for humans-in-the-loop. A particular scene might have multiple objects in it. In an exemplary video from a security camera (e.g., a bear wakes up Greenfield man sleeping by pool-YouTube), a bear is observed in the backyard and a man is observed sleeping by the pool. An intelligent security system would notify instantly of an unknown animal nearby. A symbolic explainable model would generate the following information for the security system:

1. Unknown animal (true), face (true), body (true), legs (true);
2. Person (true), legs (true), feet (true), face (false), arms (false);
3. House swimming pool (true), loungers (true) . . . .

This is the kind of new symbolic explainable system is described herein. Again, the disclosed methodology does not depend on any visualization and, therefore, does not require any human-in-the-loop. Moreover, this kind of transparent model will increase trust and confidence in the system and should open the door to wider deployment of deep learning models.

The resulting models also provide protection against adversarial attacks because of part verification.—thus, a school bus simply cannot become an ostrich due to a few pixel changes.

Large Scale, Automated Video Processing with Explainable AI Models for Reliability and Trust:

Further to the above, those knowledgeable about the field of video processing will readily recognize the problem of non-scalability, which has only worsened in recent years as the amount of data captured and requiring processing is increased with the corresponding increase of security cameras.

Video processing in surveillance systems, from drones and UAVs to CCTVs, is very labor intensive. Often, videos are simply stored for later examination because of manpower shortages. In other cases, they need real-time processing. However, in the end, both cases require humans to observe and process the captured data. In the future, because of increasing volume, video processing must be completely automated. This would save manpower costs and help in limited manpower situations. With the volume of video generated from UAVs and CCTVs increasing at a fast rate, labor-intensive video processing is a critical problem to address.

Consider the following quote, speaking about futuristic security systems: "In the future, a pan-tilt-zoom camera running AI analytics at an entry point will identify a weapon on a person, zoom in to get a closer look, and direct the access control system to lock the door to prevent entry. Simultaneously, it will send an alert to a security team, occupants or the authorities with this information and maybe even autonomously deploy a drone to find and track the person. In other words, this system will prevent a potentially harmful incident without human intervention."

To bypass "human intervention," such systems must be highly reliable and trustworthy. Deep learning is now the predominant technology for video processing. However, the decision logic of deep learning models is hard to understand, hence the NSF, Department of Defense, and DARPA are all seeking out "Explainable AI" as one approach to overcoming the problem of conventional deep learning and non-transparent AI.

It is therefore in accordance with the described embodiments a "part-based explainable system" is provided which meets the stated objectives of DARPA. Testing has shown the method to be successful on exemplary problems, such as recognizing cats and dogs and is being extended to operate on increasingly complex scenes, such as those from CCTVs and UAVs. Imagine the complexity of scenes in a hospital ICU or inside a store with many different objects. The task of defining parts of hundreds of different objects presents a problem that has never before been solved with any conventionally known image recognition technique.

Explainable models are needed to handle complex scenes with parts definition for thousands of objects. Ideas often work on simple problems but fail miserably on more complex ones. However, without explainable deep learning models, there would be unacceptably high false positives in those systems which purposefully operate "without human intervention." And yet, through the use of explainable AI models, it is possible for humans to guide the technology and curate the best approaches, while the AI models are permitted to learn and advance though the consumption of increasingly large and accessible training data sets.

Thus, while human-in-the-loop is purposefully removed from the execution of the resulting AI models which are implemented based on the teachings set forth herein, because the AI models described are expressly made to be "explainable AI models," it is nevertheless possible to apply human thinking to the advancement and development of the technology without forcing human interaction into the automated processing, which would prevent use of such technology at scale.

Figure 26:
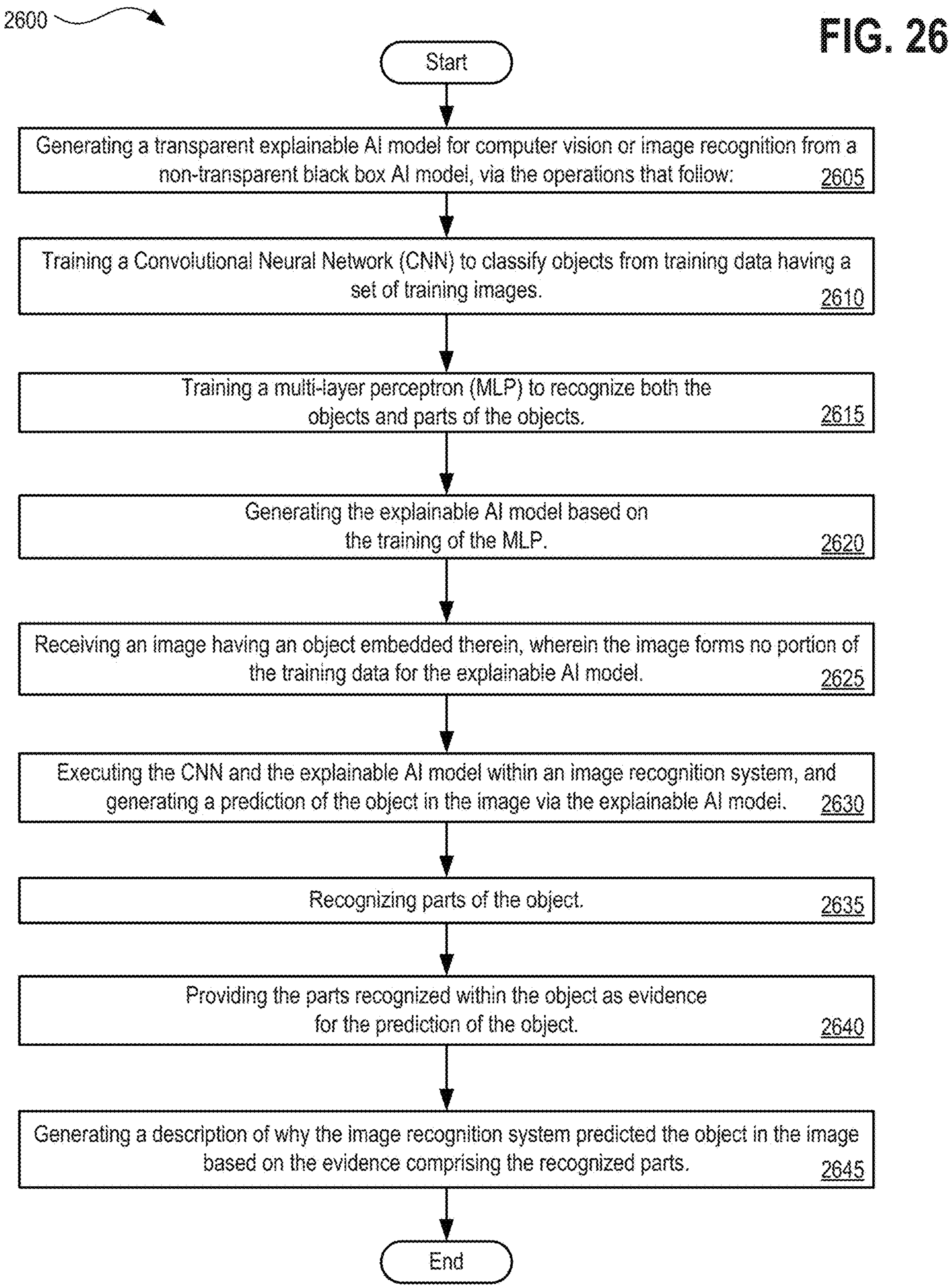
FIG. 26 depicts a flow diagram illustrating a method for implementing transparent models for computer vision and image recognition utilizing deep learning non-transparent black box models, in accordance with disclosed embodiments.

FIG. 26 depicts a flow diagram illustrating a method 2600 for implementing transparent models for computer vision and image recognition utilizing deep learning non-transparent black box models, in accordance with disclosed embodiments. Method 700 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 2701 (see FIG. 27) and the machine 2801 (see FIG. 28) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 2600 depicted at FIG. 26, there is a method performed by a system specially configured for systematically generating and outputting transparent models for computer vision and image recognition utilizing deep learning non-transparent black box models.

Such a system may be configured with at least a processor and a memory to execute specialized instructions which cause the system to perform the following operations:

At block 2605, processing logic of such a system generates a transparent explainable AI model for computer vision or image recognition from a non-transparent black box AI model, via the operations that follow.

At block 2610, processing logic trains a Convolutional Neural Network (CNN) to classify objects from training data having a set of training images.

At block 2615, processing logic trains a multi-layer perceptron (MLP) to recognize both the objects and parts of the objects.

At block 2620, processing logic generates the explainable AI model based on the training of the MLP.

At block 2625, processing logic receives an image having an object embedded therein, wherein the image forms no portion of the training data for the explainable AI model.

At block 2630, processing logic executes the CNN and the explainable AI model within an image recognition system, and generates a prediction of the object in the image via the explainable AI model.

At block 2635, processing logic recognizes parts of the object.

At block 2640, processing logic provides the parts recognized within the object as evidence for the prediction of the object.

At block 2645, processing logic generates a description of why the image recognition system predicted the object in the image based on the evidence comprising the recognized parts.

According to another embodiment of method 2600, training the MLP to recognize both the objects and the parts of the objects includes performing an MLP training procedure via operations including: (i) presenting a training image selected from the training data to the trained CNN; (ii) reading activations of a Fully Connected (FC) layer of the CNN; (iii) receiving the activations as input to the MLP; (iv) setting multi-target outputs for the training image; and (v) adjusting the weights of the MLP according to a weight adjustment method.

According to another embodiment, method 2600 further includes: transmitting at least a portion of the parts recognized within the object and the description to an explanation User Interface (UI) for display to a user of the image recognition system.

According to another embodiment of method 2600, identifying parts of the object includes decoding a convolutional neural network (CNN) to recognize the parts of the object.

According to another embodiment of method 2600, decoding the CNN includes providing information on composition of the object, the information including parts of the object and connectivity of the parts, for a model that decodes the CNN.

According to another embodiment of method 2600, the connectivity of the parts includes the spatial relationships between the parts.

According to another embodiment of method 2600, the model is a multi-layer perceptron (MLP) that is separate from the CNN model or integrated with the CNN model, in which the integrated model is trained to recognize both the objects and the parts.

According to another embodiment of method 2600, providing information on the composition of the object further includes providing information including subassemblies of the object.

According to another embodiment of method 2600, recognizing parts of the object includes examining a user-defined list of parts of the object.

According to another embodiment of method 2600, training the CNN to classify objects includes training the CNN to classify objects of interest using transfer learning.

According to another embodiment of method 2600, the transfer learning includes at least the following operations: freezing the weights of some or all convolutional layers of a pre-trained CNN, pre-trained on a class of similar objects; adding one or more flattened, fully connected (FC) layers; adding an output layer; and training the weights of both the fully connected layers and the unfrozen convolutional layers for a new classification task.

According to another embodiment of method 2600, training the MLP to recognize both the objects and the parts of the objects includes: receiving inputs from activations of one or more fully connected layers of the CNN; and providing target values from a user-defined list of parts for the output nodes of the MLP that correspond to the objects defined as objects of interests as specified by the user-defined list of parts and the parts of the objects of interest according to the user-define list of parts.

According to another embodiment, method 2600 further includes: creating the transparent explainable AI model for computer vision or image recognition from a non-transparent black box AI model via operations further including: training and testing the convolutional neural network (CNN) with a set of fully connected (FC) layers using M images of C object classes; training the multi-target MLP using a subset of a total set of images MT, wherein MT includes the original M images for CNN training plus an additional set MP of part and subassembly images, wherein for each training image $IM_k$ in MT: receiving as input an image $IM_k$ to the trained CNN; recording activations at one or more designated FC layers; receiving as input the activations of one or more designated FC layers to the multi-target MLP; setting $TR_k$ as a multi-target output vector for the image $IM_k$; and adjusting MLP weights according to a weight adjustment algorithm.

According to another embodiment of method 2600, training the CNN includes training the CNN from scratch or by using transfer learning with added FC layers.

According to another embodiment of method 2600, training the multi-target MLP using the subset of the total set of images MT, in which MT includes the original M images for CNN training plus an additional set MP of part and subassembly images, includes teaching a composition of the M images of C object classes objects from the additional set MP of part and subassembly images and their connectivity.

According to another embodiment of method 2600, teaching a composition of the M images of C object classes objects from the additional set MP of part and subassembly images and their connectivity includes: identifying the parts by showing the MLP separate images of those parts; and identifying the subassemblies by showing the MLP images of the subassemblies and listing the parts included therein, such that the MLP learns the composition of objects and subassemblies and the connectivity of the parts, given a part list for an assembly or subassembly and the corresponding image; and providing the part list to the MLP in the form of multi-target outputs for the image.

According to a particular embodiment, there is a non-transitory computer-readable storage medium having instructions stored thereupon that, when executed by a system having at least a processor and a memory therein, the instructions cause the system to perform operations including: training a Convolutional Neural Network (CNN) to classify objects from training data having a set of training images; training a multi-layer perceptron (MLP) to recognize both the objects and parts of the objects; generating the explainable AI model based on the training of the MLP; receiving an image having an object embedded therein, in which the image forms no portion of the training data for the explainable AI model; executing the CNN and the explainable AI model within an image recognition system, and generating a prediction of the object in the image via the explainable AI model; recognizing parts of the object; providing the parts recognized within the object as evidence for the prediction of the object; and generating a description of why the image recognition system predicted the object in the image based on the evidence including the recognized parts.

Figure 27:
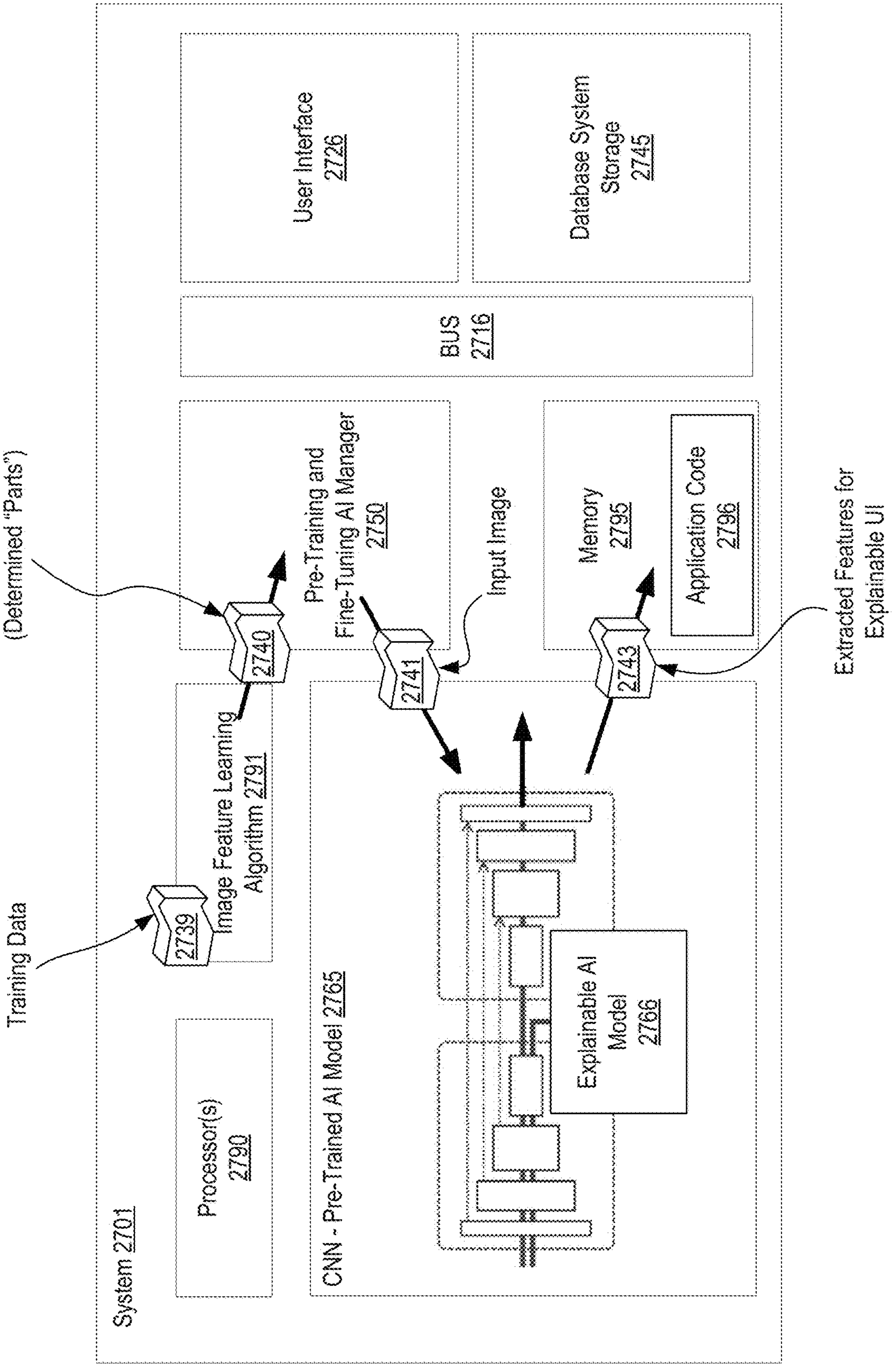
FIG. 27 shows a diagrammatic representation of a system within which embodiments may operate, be installed, integrated, or configured.

FIG. 27 shows a diagrammatic representation of a system 2701 within which embodiments may operate, be installed, integrated, or configured. In accordance with one embodiment, there is a system 2701 having at least a processor 2790 and a memory 2795 therein to execute implementing application code 2796. Such a system 2701 may communicatively interface with and cooperatively execute with the benefit of remote systems, such as a user device sending instructions and data, a user device to receive as an output from the system 2701 a specially trained "explainable AI" model 2766 having therein extracted features 2743 for use and display to a user via an explainable AI user interface which provides transparent explanations regarding determined to have been located as "parts" within the subject input image 2741 upon which the "explainable AI" model 2766 rendered its prediction.

According to the depicted embodiment, the system 2701, includes a processor 2790 and the memory 2795 to execute instructions at the system 2701. The system 2701 as depicted here is specifically customized and configured to systematically generate transparent models for computer vision and image recognition utilizing deep learning non-transparent black box models. The training data 2739 is processed through an image feature learning algorithm 2791 from which determined "parts" 2740 are extracted for multiple different objects (e.g., such as the "cats" and "dogs", etc.). a pre-training and fine-tuning AI manager 2750 may optionally be utilized to refine the prediction of a given object based upon additional training data provided to the system.

According to a particular embodiment, there is a specially configured system 2701 custom configured to generate a transparent explainable AI model for computer vision or image recognition from a non-transparent black box AI model. According to such an embodiment, the system 2701 includes: a memory 2795 to store instructions via executable application code 2796; a processor 2790 to execute the instructions stored in the memory 2795; in which the system 2701 is specially configured to execute the instructions stored in the memory via the processor to cause the system to perform operations including: training a Convolutional Neural Network (CNN) 2765 to classify objects embedded within a set of training images provided with training data 2739; training a Convolutional Neural Network (CNN) 2765 to classify objects from the training data 2739 having a set of training images; training a multi-layer perceptron (MLP) to recognize both the objects and parts of the objects via an image feature learning algorithm 2791; generating the explainable AI model 2766 based on the training of the MLP; receiving an image (e.g., input image 2741) having an object embedded therein, in which the image 2741 forms no portion of the training data 2739 for the explainable AI model 2766; executing the CNN and the explainable AI model 2766 within an image recognition system, and generating a prediction of the object in the image via the explainable AI model 2766; recognizing parts of the object; providing the parts recognized within the object as evidence for the prediction of the object vi 2743*a* extracted features for an explainable UI; and generating a description of why the image recognition system predicted the object in the image based on the evidence including the recognized parts.

According to another embodiment of the system 2701, a user interface 2726 communicably interfaces with a user client device remote from the system and communicatively interfaces with the system via a public Internet.

Bus 2716 interfaces the various components of the system 2701 amongst each other, with any other peripheral(s) of the system 2701, and with external components such as external network elements, other machines, client devices, cloud computing services, etc. Communications may further include communicating with external devices via a network interface over a LAN, WAN, or the public Internet.

Figure 28:
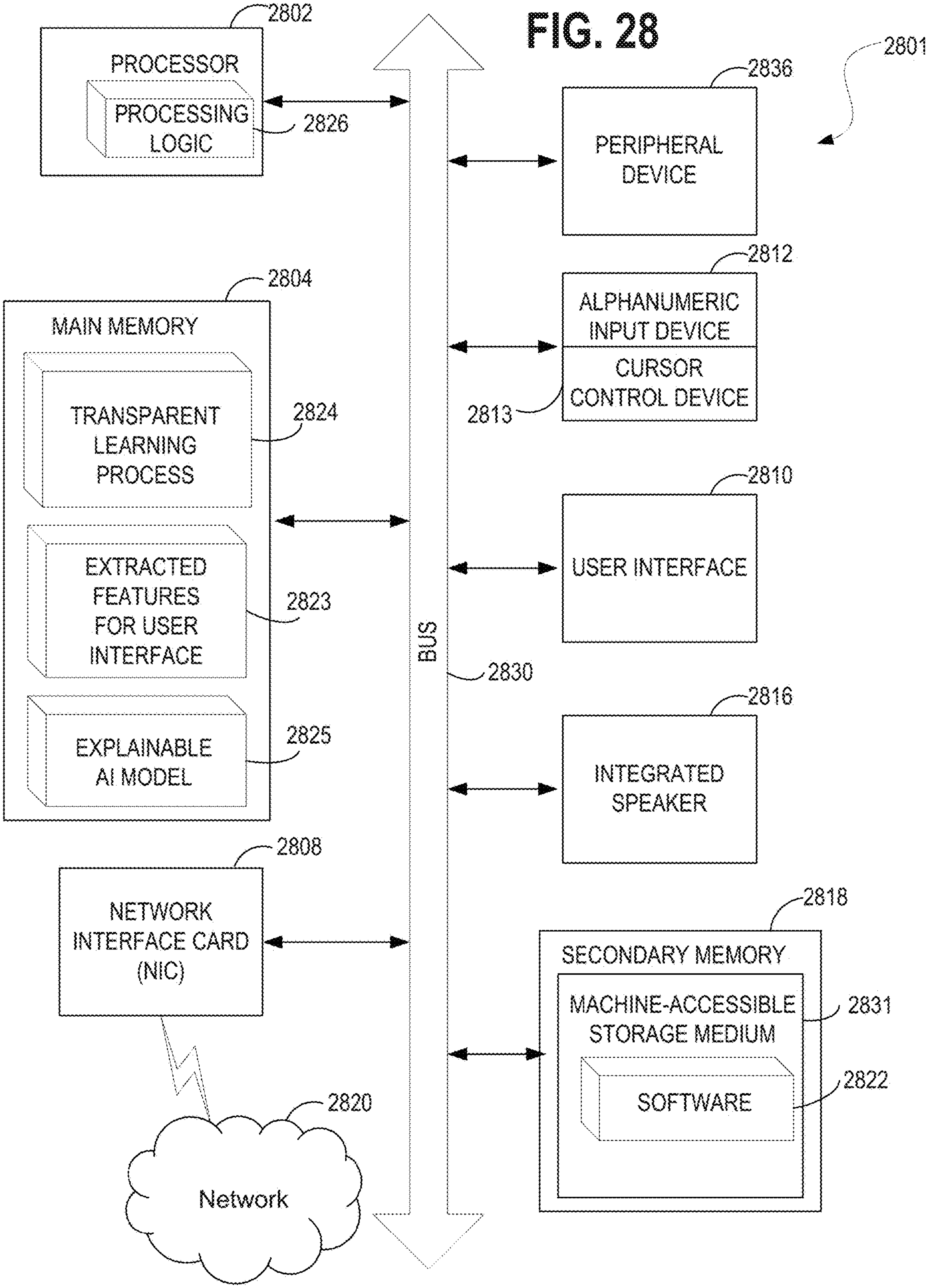
FIG. 28 illustrates a diagrammatic representation of a machine in the exemplary form of a computer system, in accordance with one embodiment.

FIG. 28 illustrates a diagrammatic representation of a machine 2801 in the exemplary form of a computer system, in accordance with one embodiment, within which a set of instructions, for causing the machine/computer system to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 2801 includes a processor 2802, a main memory 2804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 2818 (e.g., a persistent storage device including hard disk drives and a persistent database and/or a multi-tenant database implementation), which communicate with each other via a bus 2830. Main memory 2804 includes instructions for executing a transparent learning process 2824 which provides both extracted features for use by a user interface 2823 as well as generates and makes available for execution a trained explainable AI model 2825, in support of the methodologies and techniques described herein. Main memory 2804 and its sub-elements are further operable in conjunction with processing logic 2826 and processor 2802 to perform the methodologies discussed herein.

Processor 2802 represents one or more specialized and specifically configured processing devices such as a microprocessor, central processing unit, or the like. More particularly, the processor 2802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 2802 may also be one or more special-purpose processing devices such as an application-specific integrated circuit (ASIC), a field programmable gate array (FPGA), a digital signal processor (DSP), network processor, or the like. Processor 2802 is configured to execute the processing logic 2826 for performing the operations and functionality which is discussed herein.

The computer system 2801 may further include a network interface card 2808. The computer system 2801 also may include a user interface 2810 (such as a video display unit, a liquid crystal display, etc.), an alphanumeric input device 2812 (e.g., a keyboard), a cursor control device 2813 (e.g., a mouse), and a signal generation device 2816 (e.g., an integrated speaker). The computer system 2801 may further include peripheral device 2836 (e.g., wireless or wired communication devices, memory devices, storage devices, audio processing devices, video processing devices, etc.).

The secondary memory 2818 may include a non-transitory machine-readable storage medium or a non-transitory computer readable storage medium or a non-transitory machine-accessible storage medium 2831 on which is stored one or more sets of instructions (e.g., software 2822) embodying any one or more of the methodologies or functions described herein. The software 2822 may also reside, completely or at least partially, within the main memory 2804 and/or within the processor 2802 during execution thereof by the computer system 2801, the main memory 2804 and the processor 2802 also constituting machine-readable storage media. The software 2822 may further be transmitted or received over a network 2820 via the network interface card 2808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A computer-implemented method performed by a system having at least a processor and a memory therein for creating a transparent explainable AI model for computer vision or image recognition from a non-transparent black box AI model, wherein the method comprises:

training a Convolutional Neural Network (CNN) to classify objects from training data having a set of training images;

training a multi-layer perceptron (MLP) to recognize both the objects and parts of the objects by performing an MLP training procedure via operations including: (i) presenting a training image selected from the training data to the trained CNN, (ii) reading activations of a Fully Connected (FC) layer of the CNN, (iii) receiving the activations as input to the MLP, (iv) setting multi-target outputs for the training image, and (v) adjusting weights of the MLP according to a weight adjustment method;

generating the explainable AI model based on the training of the MLP;

receiving an image having an object embedded therein, wherein the image forms no portion of the training data for the explainable AI model;

executing the CNN and the explainable AI model within an image recognition system, and generating a prediction of the object in the image via the explainable AI model;

recognizing parts of the object;

providing the parts recognized within the object as evidence for the prediction of the object; and generating a description of why the image recognition system predicted the object in the image based on the evidence comprising the recognized parts.

2. The method of claim 1, further comprising:

transmitting at least a portion of the parts recognized within the object and the description to an explanation User Interface (UI) for display to a user of the image recognition system.

3. The method of claim 1, wherein recognizing parts of the object comprises decoding the convolutional neural network (CNN) to recognize the parts of the object.

4. The method of claim 3, wherein decoding the CNN comprises providing information on composition of the object, the information including parts of the object and connectivity of the parts, for a model that decodes the CNN.

5. The method of claim 4, wherein the connectivity of the parts comprises the spatial relationships between the parts.

6. The method of claim 5, wherein the model is a multi-layer perceptron (MLP) that is separate from the CNN model or integrated with the CNN model, wherein the integrated model is trained to recognize both the objects and the parts.

7. The method of claim 6, wherein providing information on the composition of the object further comprises providing information including subassemblies of the object.

8. The method of claim 1, wherein recognizing parts of the object comprises examining a user-defined list of parts of the object.

9. The method of claim 1, wherein training the CNN to classify objects comprises training the CNN to classify objects of interest using transfer learning.

10. The method of claim 9, wherein transfer learning comprises:

freezing weights of some or all convolutional layers of a pretrained CNN, pretrained on a class of similar objects;

adding one or more flattened, fully connected (FC) layers;

adding an output layer; and training weights of both the fully connected layers and the unfrozen convolutional layers for a new classification task.

11. The method of claim 1, wherein training the MLP to recognize both the objects and the parts of the objects comprises:

receiving inputs from activations of one or more fully connected layers of the CNN; and providing target values from a user-defined list of parts for the output nodes of the MLP that correspond to the objects defined as objects of interests as specified by the user-defined list of parts and the parts of the objects of interest according to the user-define list of parts.

12. The method of claim 1, further comprising:

creating the transparent explainable AI model for computer vision or image recognition from a non-transparent black box AI model via operations further including:

training and testing the convolutional neural network (CNN) with a set of fully connected (FC) layers using M images of C object classes;

training the multi-target MLP using a subset of a total set of images MT, wherein MT includes the original M images for CNN training plus an additional set MP of part and subassembly images;

wherein the training for each image IMK in MT, comprises:

(i) receiving as input an image IMK to the trained CNN;

(ii) recording activations at one or more designated FC layers;

(iii) receiving as input the activations of one or more designated FC layers to the multi-target MLP;

(iv) setting $TR_k$ as a multi-target output vector for the image IMK; and (v) adjusting MLP weights according to a weight adjustment algorithm.

13. The method of claim 12, wherein training the CNN comprises training the CNN from scratch or by using transfer learning with added FC layers.

14. The method of claim 12, wherein training the multi-target MLP using the subset of the total set of images MT, wherein MT includes the original M images for CNN training plus an additional set MP of part and subassembly images, comprises teaching a composition of the M images of C object classes objects from the additional set MP of part and subassembly images and their connectivity.

15. The method of claim 14, wherein teaching composition of the M images of C object classes from the additional set MP of part and subassembly images and their connectivity comprises:

identifying the parts by showing the MLP separate images of those parts; and identifying the subassemblies by showing the MLP images of the subassemblies and listing the parts included therein, such that the MLP learns the composition of objects and subassemblies and the connectivity of the parts, given a part list for an assembly or subassembly and the corresponding image; and providing the part list to the MLP in the form of multi-target outputs for the image.

16. A system comprising:

a memory to store instructions;

a processor to execute the instructions stored in the memory;

wherein the system is specially configured to execute the instructions stored in the memory via the processor to cause the system to perform operations including:

training the Convolutional Neural Network (CNN) to classify objects;

training a Convolutional Neural Network (CNN) to classify objects from training data having a set of training images;

training a multi-layer perceptron (MLP) to recognize both the objects and parts of the objects by performing an MLP training procedure via operations including: (i) presenting a training image selected from the training data to the trained CNN, (ii) reading activations of a Fully Connected (FC) layer of the CNN, (iii) receiving the activations as input to the MLP, (iv) setting multi-target outputs for the training image, and (v) adjusting weights of the MLP according to a weight adjustment method;

generating the explainable AI model based on the training of the MLP;

receiving an image having an object embedded therein, wherein the image forms no portion of the training data for the explainable AI model;

executing the CNN and the explainable AI model within an image recognition system, and generating a prediction of the object in the image via the explainable AI model;

recognizing parts of the object;

providing the parts recognized within the object as evidence for the prediction of the object; and generating a description of why the image recognition system predicted the object in the image based on the evidence comprising the recognized parts.

17. The system of claim 16, further comprising:

transmitting at least a portion of the parts recognized within the object and the description to an explanation User Interface (UI) for display to a user of the image recognition system.

18. The system of claim 16:

wherein recognizing parts of the object comprises decoding the convolutional neural network (CNN) to recognize the parts of the object;

wherein decoding the CNN comprises providing information on composition of the object, the information including parts of the object and connectivity of the parts, for a model that decodes the CNN;

wherein the connectivity of the parts comprises the spatial relationships between the parts;

wherein the model is a multi-layer perceptron (MLP) that is separate from the CNN model or integrated with the CNN model, wherein the integrated model is trained to recognize both the objects and the parts; and wherein providing information on the composition of the object further comprises providing information including subassemblies of the object.

19. Non-transitory computer readable storage media having instructions stored thereupon that, when executed by a process of a system, the instructions cause the system to perform operations including:

training a Convolutional Neural Network (CNN) to classify objects from training data having a set of training images;

training a multi-layer perceptron (MLP) to recognize both the objects and parts of the objects by performing an MLP training procedure via operations including: (i) presenting a training image selected from the training data to the trained CNN, (ii) reading activations of a Fully Connected (FC) layer of the CNN, (iii) receiving the activations as input to the MLP, (iv) setting multi-target outputs for the training image, and (v) adjusting weights of the MLP according to a weight adjustment method;

generating the explainable AI model based on the training of the MLP;

receiving an image having an object embedded therein, wherein the image forms no portion of the training data for the explainable AI model;

executing the CNN and the explainable AI model within an image recognition system, and generating a prediction of the object in the image via the explainable AI model;

recognizing parts of the object;

providing the parts recognized within the object as evidence for the prediction of the object; and generating a description of why the image recognition system predicted the object in the image based on the evidence comprising the recognized parts.

20. The non-transitory computer readable storage media of claim 19, wherein the instructions cause the system to perform operations further comprising:

transmitting at least a portion of the parts recognized within the object and the description to an explanation User Interface (UI) for display to a user of the image recognition system.

21. The non-transitory computer readable storage media of claim 19:

wherein recognizing parts of the object comprises decoding the convolutional neural network (CNN) to recognize the parts of the object;

wherein decoding the CNN comprises providing information on composition of the object, the information including parts of the object and connectivity of the parts, for a model that decodes the CNN;

wherein the connectivity of the parts comprises the spatial relationships between the parts;

wherein the model is a multi-layer perceptron (MLP) that is separate from the CNN model or integrated with the CNN model, wherein the integrated model is trained to recognize both the objects and the parts; and wherein providing information on the composition of the object further comprises providing information including subassemblies of the object.

* * * * *